United States Patent
de Souza et al.

(10) Patent No.: US 12,319,873 B2
(45) Date of Patent: Jun. 3, 2025

(54) DIVERTER ACID FLUID COMPOSITION FOR THE STIMULATION OF RESERVOIRS BY MATRIX ACIDIFICATION

(71) Applicants: UNIVERSIDADE ESTADUAL DE CAMPINAS, Campinas (BR); PETROLEO BRASILEIRO S/A—PETROBRAS, Rio de Janeiro (BR)

(72) Inventors: Renato Nunes de Souza, Campinas (BR); Manazael Zuliani Jora, Santa Barbara D'oeste (BR); Matheus da Silva Barbosa, Campinas (BR); Edvaldo Sabadini, Campinas (BR); Carlos Speglich, Campinas (BR)

(73) Assignees: PETROLEO BRASILEIRO S/A—PETROBRAS, Rio de Janeiro (BR); UNIVERSIDADE ESTADUAL DE CAMPINAS, Campinas (BR)

(*) Notice: Subject to any disclaimer, the term of this patent is extended or adjusted under 35 U.S.C. 154(b) by 40 days.

(21) Appl. No.: 17/907,400

(22) PCT Filed: Mar. 25, 2021

(86) PCT No.: PCT/BR2021/050125
§ 371 (c)(1),
(2) Date: Sep. 26, 2022

(87) PCT Pub. No.: WO2021/189123
PCT Pub. Date: Sep. 30, 2021

(65) Prior Publication Data
US 2023/0121527 A1    Apr. 20, 2023

(30) Foreign Application Priority Data
Mar. 26, 2020    (BR) .................... BR102020006183 6

(51) Int. Cl.
*C09K 8/72*    (2006.01)
(52) U.S. Cl.
CPC .................................... *C09K 8/725* (2013.01)
(58) Field of Classification Search
CPC ............ C09K 8/72; C09K 8/725; C09K 8/74; C09K 8/76; C09K 8/78; C09K 2208/06; C09K 2208/30; E21B 43/26; E21B 43/27
See application file for complete search history.

(56) References Cited

U.S. PATENT DOCUMENTS

| 2002/0004464 A1 | 1/2002 | Nelson et al. |
| 2003/0134751 A1* | 7/2003 | Lee ...................... C09K 8/5753 |
| | | 507/200 |

(Continued)

FOREIGN PATENT DOCUMENTS

| CN | 107841303 A | 3/2018 |
| EP | 0835983 A2 | 4/1998 |

OTHER PUBLICATIONS

International Search Report dated May 7, 2021 in Application No. PCT/BR2021/050125.

*Primary Examiner* — Angela M DiTrani Leff
(74) *Attorney, Agent, or Firm* — FOX ROTHSCHILD LLP

(57) ABSTRACT

A diverter acid fluid composition for use in the stimulation of oil wells during exploration thereof, named Quovadis is disclosed. The diverter acid fluid may be used for stimulating oil wells during matrix acidification. The role thereof is to improve the efficiency of processes of stimulation of wells by acid treatment allowing the fluid to come into contact with regions of low permeability of the carbonate rock matrix, i.e., regions of difficult access. The diverter acid fluid also removes permanent formation damage around the well, (Continued)

allowing for greater coverage of the treatment and, consequently, better use of the treatment.

9 Claims, 10 Drawing Sheets

(56) References Cited

U.S. PATENT DOCUMENTS

| | | | |
|---|---|---|---|
| 2003/0139298 A1* | 7/2003 | Fu | C09K 8/74 |
| | | | 507/200 |
| 2004/0209780 A1* | 10/2004 | Harris | C09K 8/68 |
| | | | 507/117 |
| 2005/0020454 A1 | 1/2005 | Francini et al. | |
| 2005/0126786 A1* | 6/2005 | Fu | C09K 8/74 |
| | | | 166/307 |
| 2006/0042797 A1* | 3/2006 | Fredd | E21B 43/26 |
| | | | 166/312 |
| 2006/0046937 A1* | 3/2006 | Fu | C09K 8/602 |
| | | | 507/131 |
| 2006/0081370 A1 | 4/2006 | Fu et al. | |
| 2006/0105919 A1* | 5/2006 | Colaco | C09K 8/584 |
| | | | 507/209 |
| 2007/0151726 A1* | 7/2007 | Crews | C09K 8/602 |
| | | | 507/201 |
| 2007/0256835 A1 | 11/2007 | Fu et al. | |
| 2008/0139410 A1* | 6/2008 | Chen | C09K 8/68 |
| | | | 507/204 |
| 2008/0146465 A1 | 6/2008 | Fu et al. | |
| 2010/0056405 A1* | 3/2010 | Ali | C23F 11/141 |
| | | | 507/263 |

* cited by examiner

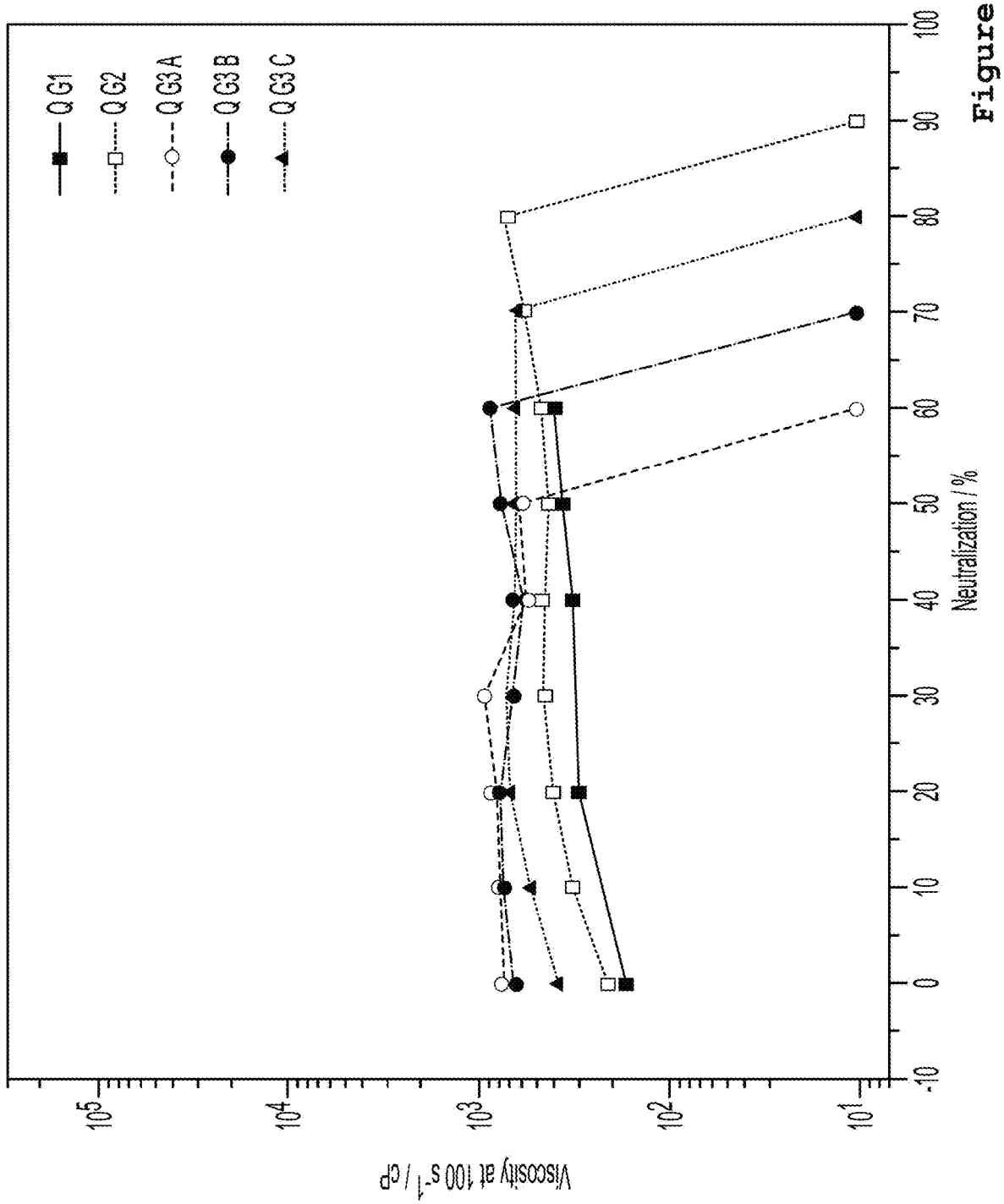

DIVERTER ACID FLUID COMPOSITION FOR THE STIMULATION OF RESERVOIRS BY MATRIX ACIDIFICATION

FIELD OF THE INVENTION

This invention relates to a diverter acid fluid composition for use in stimulating oil wells during their exploration, called Quovadis.

The invention is used as a diverter acid fluid for oil well stimulation during matrix acidification. Its function is to improve the performance of well stimulation processes through acid treatments, allowing the fluid to come into contact with regions of low permeability of the carbonaceous rock matrix, that is, regions of difficult access. In addition to removing permanent damage to the formation around the well, allowing a greater coverage of the treatment and consequently a greater use of the treatment.

BACKGROUND OF THE INVENTION

The state of the art presents as a problem the possible low efficiency of the operations of stimulation of carbonate reservoirs using the matrix acidification process due to the properties of the diverter fluids used. One of the challenges faced during oil exploration is the optimization of stimulation operations in carbonate reservoirs, given the complex relationships between fluid reactions with the rock matrix and the flow occurring in a porous medium. Well stimulation, one of the stages of oil extraction, aims to remove the damage caused to the rock during drilling and, mainly, aims to improve the flow conditions around an already active well, leading to a significant increase in productivity, thus increasing the profitability of the project and providing the return on investment in the operation. Several techniques are used to increase the permeability of the substrate or reduce the viscosity of fluids, such as hydraulic fracturing and matrix acidification.

Matrix acidification is a stimulation technique, which makes use of unconventional acidic compositions to remove damage and improve flow conditions in regions peripheral to the well. The fluids used are generally acidic mixtures (hydrochloric acid, acetic acid or hydrofluoric acid depending on the type of rock in the formation) below the fracture pressure. When used in carbonaceous reservoirs, acidification creates branching patterns, called wormholes, due to the chemical reaction between the acid of the injected fluid and the rocks in the reservoir, which guarantees an increase in the permeability of the well. This stimulation process occurs due to a simple acid-base reaction between the $H^+$ ions of the diverter acid fluid and the carbonaceous rock of the reservoir according to the reaction below.

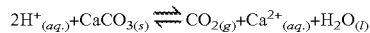

$$2H^+_{(aq.)} + CaCO_{3(s)} \rightleftharpoons CO_{2(g)} + Ca^{2+}_{(aq.)} + H_2O_{(l)}$$

For conventional acid mixtures, the improvement of flow conditions occurs mostly in regions that are naturally more permeable and, as a consequence, stimulating fluids do not access regions of greater resistance and less permeability. To circumvent this problem, diverter fluids are used which, when injected, momentarily decrease the fluid mobility in easily accessible regions, due to the increase in viscosity, forcing the fluid to access regions of lower permeability. Diverter fluids can respond to different well characteristics such as pressure, temperature, ionic strength and pH. As a response, there is a modification of its rheological properties, in order to momentarily impede the flow in the regions of greater permeability so that the fluid disperses, also attacking the regions of more difficult access.

Diverter acidic fluids play a key role in oil well stimulation. The rheological profile of the pumped fluid as a function of the advance of the acid-base reaction must present specific characteristics. Initially, low viscosity is desirable to facilitate the pumping of the fluid and allow it to permeate the rocks. With the advance of acid neutralization by the reaction with the matrix, changes occur in the fluid properties that lead to an increase in viscosity. In this way, momentarily, the mobility of the region that was stimulated is reduced, redirecting the injected acid mixture to a different region. Finally, the viscosity of the solution should decrease again, in order to facilitate the flow.

This invention proposes a composition that achieves more advantageous results for oil production, as it is a fluid capable of rheologically responding to stimuli of metallic ions (for example, calcium and magnesium ions that come from the corrosion of carbonaceous rocks) and changes in the acidity of the medium. In this way, the acid fluid only increases its viscosity in regions where the reaction between the acid and the carbonate takes place. This feature may be used in matrix acidification operations to improve the fluid divergence in the well, in favor of lower permeability zones, thus maximizing treatment coverage and consequently the result of the operation.

The scientific paper by D. Taylor, SPE, entitled "Viscoelastic Surfactant based Self-diverting Acid for Enhanced Stimulation in Carbonate Reservoirs", 82263 (2003) reports a self-diverter acidic fluid based on viscoelastic surfactants (VES), the fluid composition is not disclosed. The article provides apparent viscosity data at high shear rates for solutions prepared with different concentrations of hydrochloric acid (HCl), that is, solutions with different acidity. In order to simulate the product of acid neutralization by calcium carbonate ($CaCO_3$) from a carbonaceous rock aliquots of calcium chloride (CaCl2)) are added to different concentrations. The authors state that the divergence phenomenon occurs when the acid fluid is partially neutralized, causing the VES to pass from a state of aggregation of spherical micelles to giant micelles, gaining viscosity. The fluid presented by this invention has a different rheological profile from that presented by the article, having higher apparent viscosity.

In the scientific article by F. C. Lechuga, 3rd Brazilian Congress of R & D in Oil and Gas, entitled "Evaluation of commercial surfactants with potential application as diverter agents", Oct. 2 to 5, 2005, Salvador, BA, the applicability of two formulations composed of commercial surfactants for diverter fluids was evaluated. One formulation was based on a sultaine-type mixed ionic surfactant and the other was based on an aminopropionate-type amphoteric surfactant. The authors characterized the rheological behavior of commercial formulations under reservoir conditions, for which tests were performed varying the shear rate, temperature and pH of the medium. The results obtained showed that both formulations present stability against temperature and pH variation. The amphoteric surfactant has a viscosity profile more characteristic of diverter fluids, this behavior may be associated with the amphoteric characteristic of the surfactant. The document does not present the detailed composition of the solutions evaluated, but this invention differs mainly in the type of surfactant used and has the advantage of the rheological profile obtained by varying the acidity of the medium; the rheological profile of the composition of this invention is more efficient to act as an acid diverter.

The scientific paper by H. A. Nasr-El-Din, SPE Journal, entitled "Impact of Acid Additives on the Rheological Properties of a Viscoelastic Surfactant and Their Influence on Field Application", 89418 (2008) reports the rheological behavior of viscoelastic fluids, of unspecified composition, based on amphoteric surfactants of the carboxybetaine family against variations in temperature, pressure, pH, shear rate and medium composition. The article reports apparent viscosity data for different diverter fluid compositions, varying shear rate, temperature, acid concentration and additives and contaminants. Part of the compositions reported in the article are self-diverter fluids capable of structuring into elongated aggregates to increase the viscosity of the medium by modifying the acidity of the medium. This invention does not make use of surfactants from the carboxybetaine family and has the advantage of the rheological profile obtained showing greater gains in viscosity, which allows higher yields during acid treatment.

The scientific paper by Z. Yan, Colloid Polym Sei, entitled "Study of pH-responsive surface active ionic liquids: the formation of spherical and wormlike micelles", 293 (2015) 1759 to 1766, reports a pH-responsive system, consisting of cationic surfactant N-hexadecyl-N-methylpyrrolidinium bromide ($C_{16}MPBr$) and potassium hydrogen phthalate (PPA). The authors report a variation in the properties of the system when its microstructure switches, depending on the pH, between spherical and giant micelles. The authors support this hypothesis with results from rheology, cryogenic transmission microscopy (Cryo-TEM) and dynamic light scattering (DLS). Magnetic resonance (NMR) and UV-vis tests were performed and with the results, this property was attributed to the change in the ability of PPA to shield surfactant charges at different pHs. In addition, the authors evaluated the system for the variation of the molar ratio between species, ranging $[RPPA]/[C_{16}MPBr]$ from approximately 0.2 to 1.8, and the total concentration of components, ranging from approximately 50 to 350 mM (in $[RPPA]/[C_{16}MPBr]=0.71$) using stationary rheology. Flow curves are reported for 6 samples containing 70 mM $C_{16}MPBr$ and 50 mM PPA, in a pH window ranging from 2.03 to 6.02. With the exception of the samples at pH 2 and 6, which presented profiles of Newtonian liquids, a pseudoplastic behavior was observed for the other samples. In such cases, the system viscosity ranged from low values to approximately 16 Pa·s. Oscillatory rheology tests were reported, varying the pH of the samples between 3.07 and 5.03, analyzing the results according to the Maxwell model and obtaining relaxation time and $G_0$ values. In this investigation, the sample at pH 4 presented the highest values for both quantities. The article also points out a reversibility in the aggregation of the system when it reports $h_0$ values obtained by alternating the pH of a sample between 2 and 4, for 7 times. Both Cryo-TEM images and DLS tests indicate a growth of aggregates at pH 4. Finally, the article points out the modification of PPA when the pH is varied between 2 and 6, and also when $C_{16}MPBr$ is added in the system by modifying the UV-vis spectrum and coupling the $H^1$ of the PPA in the NMR spectrum. The system described in the article has a quaternary amine cationic surfactant and a pH-responsive aromatic co-solute, but its composition is very simple compared to the composition of this invention. The fluid has a rheological profile with a maximum viscosity lower than that of QuoVadis, the fluid described in this invention. This invention has as advantages the performance in the application of the fluid as a diverter and the rheological profile obtained by partially neutralizing the fluid.

Kalur et al. presented a study entitled "Viscosity Increase with Temperature in Cationic Surfactant Solutions Due to the Growth of Wormlike Micelles" 21 (2005) 10998 to 11004, of a fluid consisting of cationic surfactant, erucyl bis(hydroxyethyl)methylammonium chloride (EHAC) with the anionic aromatic salt, sodium hydroxynaphthalene carboxylate (SHNC), where it was possible to modulate the viscosity of the mixture by altering the proportion between surfactant and co-solute and temperature. The results were compared with data obtained using sodium salicylate (NaSal) in a previous work by the same research group. The authors presented results of a temperature phase diagram as a function of NaSal and SHNC concentration, in order to isolate the concentrations and temperatures necessary for the formation of the desired colloidal structures in solution, the giant micelles. Rheology experiments in the linear and non-linear regime, showing the viscosity and viscoelasticity of the fluid in the region of formation of the giant micelles were also carried out, as well as low-angle neutron scattering (SANS) experiments to characterize structural parameters of the giant micelles. Setting the EHAC concentration at 40 mM and the temperature at 25° C., the authors constructed the phase diagram and observed that at SHNC concentrations below 10 mM, the fluid presented high viscosity values, for SHNC concentrations between 15 to 85 mM, the fluid showed low viscosity values, in addition to the separation of two immiscible liquid phases, and, for SHNC concentrations above 85 mM, the viscosity values increased again in a single-phase solution. Analyzing the temperature variations, from 25 to 70° C., the authors showed that a profile of viscosity increase as a function of temperature increase, passing through a maximum viscosity and then its decrease. This profile was observed for the 260 and 280 mM SHNC cases. Through SANS measurements, the authors showed that the increase in viscosity is due to the increase in the size of the boundary length of the micellar aggregates formed. The fluid of this invention has a rheological profile that depends on the concentration of the components in solution and on the temperature, as presented by this article. However, the viscosity modules obtained by this invention are much higher than those reported by the article in question, a fundamental parameter for acting as a diverter. Furthermore, the fluid presented by the article suffers from phase separation at relatively low concentrations, a characteristic which does not occur in the fluid of this invention. The authors also do not present the effect that pH has on the formulation, another fundamental property for the development of a diverter acid fluid.

Ali et al. presents in "Hydrogen-Bond-Induced Microstructural Transition of Ionic Micelles in the Presence of Neutral Naphthols: pH Dependent Morphology and Location of Surface Activity" 133 (2009) 15563 to 15571, results of a fluid formed with cationic surfactant, cetyltrimethylammonium bromide (CTAB), and one of the two aromatic co-solutes derived from naphthalene, 2-methoxynaphthalene (MN) or 2-hydroxynaphthalene (HN). For characterization, they performed nuclear magnetic resonance and spectroscopy experiments in the ultraviolet-visible region, to investigate the change in pKa of HN due to different chemical environments and the role of hydrogen bonding in the hydroxyl group of HN with the aqueous medium. Non-linear rheology experiments were performed to determine the viscosity of the solutions, measurements of interfacial tension to determine the concentration where micellar aggregates are formed and transmission electron microscopy at cryogenic temperatures (cryo-TEM) to acquire images of the aggregates formed in solution. With the results, the authors showed that both MN and HN reduce the interfacial tension of the solution containing micellar aggregates of CTAB, however, only the HN is able to induce the micellar growth of spheres to elongated structures, conferring to the solution viscoelastic properties and of viscosity increase. The phenomenon is observed only with naphthol, because when the co-solutes are bodied in the aggregates, the hydroxyl group of the HN is exposed to the aqueous medium, favoring hydrogen bonds with the water molecules. For this to happen, the molecule must accommodate at the interface between the aggregate and the bulk, leading to the formation of elongated structures. In the case of MN, these interactions are absent, and HN is fully incorporated by the micellar aggregate, preserving the spherical structure. The authors also show that the fluid containing CTAB and HN is responsive to pH in the range of 2 to 12. Cryo-TEM images confirm the spherical structures formed in the case of MN and the elongated ones formed with HN. As much as the fluid developed in this scientific article is responsive to changes in pH of the medium, it presents several disadvantages when raised as a possible diverter and when compared to the fluid proposed in this invention. It is desirable that diverter acidic fluids present viscosity gains at acidic pH values, soon after the reaction of the fluid with the carbonaceous rocks. The fluid presented in this article cannot be considered an efficient diverter, as it shows a decrease in viscosity at acidic pH values, gaining viscosity only when the pH values reach something around 5 to 6. Furthermore, the observed viscosity gain is only a few tens of cP when comparing its maximum viscosity with its initial viscosity. On the other hand, the composition of this invention gains several orders of magnitude of viscosity when its maximum viscosity is compared to its initial viscosity. Thus, the fluid presented in this scientific article cannot be framed as a diverter acid potential.

In the scientific article "Rheological properties and application of wormlike micelles formed by sodium oleate/benzyltrimethyl ammonium bromide" 500 (2016) 222 to 229, published by Huang et al., a fluid containing a pH-responsive giant micelle formed from an anionic surfactant, sodium oleate (NaOA), and a cationic organic co-solute, benzyltrimethylammonium bromide (BTAB) is presented. This fluid was used as a model for the synthesis of nanoparticles of tetraethyl orthosilicate (TEOS). For the characterization of the system, the authors present linear and non-linear rheology results, in order to obtain information on the viscosity and viscoelasticity characteristics of the fluid at the different pH values studied. Dynamic light scattering experiments were performed to obtain the hydrodynamic radius of the formed colloidal aggregate and transmission electron microscopy to obtain images of the formed TEOS nanoparticles. X-ray diffraction experiments were performed to investigate the composition of TEOS nanoparticles and isothermal adsorption measurements were conducted to determine physical parameters of the formed nanoparticles, such as pore size distribution, wall thickness, surface area and pore volume. The fluid prepared from 120 mmol $L^{-1}$ of NaGA and 200 mmol $L^{-1}$ of BTAB showed a gain in viscosity increasing the pH from 8 to 10, with maximum viscosity at approximately pH 8.4. The gain in fluid viscosity is associated with the formation of giant micelles and was 6 times when comparing the maximum viscosity with its initial viscosity. After the maximum viscosity, the micellar structures decrease in size and therefore the fluid decreases its viscosity. Although the fluid proposed by this scientific article is a pH-responsive fluid, it does not have the necessary characteristics to be applied as a diverter fluid. Diverter fluids are used in environments of extreme acidity, characterized by low pH values, however, the fluid presented in the work in question undergoes phase separation for pH values lower than 8.0. In this case, sodium oleate is hydrolyzed, leading to the formation of oleic acid, which is completely insoluble in water.

In the article "pH-Responsive self-assembly in an aqueous mixture of surfactant and hydrophobic amino acid mimic", 5 (2009) 2919 to 2927, G. Verma et al. describe a system of aggregates responsive to pH variation. Such aggregates are made up of a cationic surfactant, cetyltrimethylammonium bromide (CTAB) and anthranilic acid (AA), a hydrophobic amino acid that acts as a co-solute. The system is characterized by rheology, light scattering and small-angle neutron scattering (SANS). The authors present data that suggest the structural changes of the aggregates with the variation of the pH. For low pH values, down to approximately 3, the AA molecule should be in its protonated form. This species does not provide a major contribution to the formation of elongated aggregates, therefore, the data presented suggest that the aggregates formed have spherical structures. As the pH increases to values close to 4, the carboxyl of anthranilic acid is deprotonated, acquiring a negative charge and the molecule is mostly incorporated into the micellar structure as a result of the reduction in the surface charge of the micelles, leading to a structural evolution from small spherical micelles to long giant micelles. The rheological tests were carried out with solutions prepared with 50 mmol $L^{-1}$ of CTAB and 50 mmol $L^{-1}$ of AA, adjusting the pH to 2.9; 4.1; 5.0; 5.9; 7.0; 12.0 and 12.3. These data showed an increase of four orders of magnitude in the viscosity obtained in the Newtonian plateau for the fluid with small changes in the pH of the solution, in addition to evidencing transitions in the fluid flow curves, which pass from Newtonian (evidenced at pH 2.9) to viscoelastic with an increase in the pH of the solution. Evaluating the data obtained for viscosity in the Newtonian plateau as a function of pH, it is observed that the fluid viscosity presents low values at pH equal to 2.9, goes through a maximum at pH values around 4 and 5 and, then, it reduces again after reaching pH values greater than 6. This viscosity profile is obtained by protonating and/or deprotonating the COOH and $NH_2$ groups of the co-solute, which modifies the state of aggregation with the surfactant. The system presented in this article does not have the required rheological profile for diverters, the pH range in which it presents high viscosity is very low, limiting the performance window; it is also observed that the maximum viscosity is obtained at pH 5, which means that the fluid must be neutralized a lot to reach its maximum efficiency. Finally, the fluid shows no relevant viscosity reduction after being neutralized, and the viscosity at pH 12 is approximately 100 cP.

Patel et al., in the article "pH controlled size/shape in CTAB micelles with solubilized polar additives: A viscometry, scattering and spectral evaluation" 455 (2014) 67 to 75, performed rheology, nuclear magnetic resonance (NMR) tests, dynamic light scattering (DLS) and small-angle neutron scattering (SANS) and report structural changes in aggregates from three different systems, which are caused by variation in pH. All systems have cetyltrimethylammonium bromide (CTAB) as a surfactant and 4-methylbenzoic acid, 4-methylphenol or 4-aminotoluene as a co-solute. The authors evaluate the effect of co-solute concentration on viscosity, for samples with CTAB concentration of 50 mmol $L^{-1}$. For this, the co-solute concentration is varied between 0 to 35 mmol $L^{-1}$ for 4-methylbenzoic acid, 0 to 80 mmol $L^{-1}$ for 4-methylphenol and 0 to 200 mmol $L^{-1}$ for 4-aminotoluene. As for the tests evaluating the effects of the pH variation of the medium on the structure of the aggregates, they occur with solutions of 50 mmol $L^{-1}$ of surfactant and 25 mmol $L^{-1}$ of aromatic co-solute, varying the pH between 1 and 12. The authors argue that the morphological changes of the aggregates as a function of pH are due to changes in the interactions between the additives and the CTAB. The pH variation changes the charge on the polar group and leads to protonation/deprotonation of the acid/base group of the additives. Evaluating the response of viscosity as a function of pH for 4-methylbenzoic acid, it was observed that the solution has a high viscosity at pH 1. However, for a slight increase in pH to 2, the viscosity drops, reaching its lowest value at pH values between 2 and 3. Then the viscosity increases slightly until pH 5 and becomes practically constant until pH 12. The behavior observed for 4-methylphenol is similar, where the fluid has high viscosity at pH 1, drop in viscosity values at pH 2, remaining approximately constant until pH values close to 8, reaching a maximum value close to pH 10 to later decrease in pH values of approximately 11. On the other hand, the profile of 4-aminotoluene is different from the others, it has low viscosity at lower pH values, a maximum viscosity for pH values between 4 and 6 and increases its viscosity again in alkaline environments with pH values close to 11. The rheological control of the fluid presented in this article occurs through changes in the polarity and charge of the co-solutes, this mechanism is observed in several diverters, but the rheological profile of viscosity variation with pH is not suitable for this application in any of the systems studied, and none of them presents substantial viscosity gain at intermediate pH values, since the maximum viscosity values occur when the medium is too acidic or too alkaline.

The scientific article entitled "pH-switchable wormlike micelle formation by N-alkyl-N-methylpyrrolidinium bromide-based cationic surfactant" 482 (2015) 283 to 289, published by Z. Yan and collaborators presents a pH-responsive system constituted per 80 mmol $L^{-1}$ of n-hexadecyl-n-methylpyrrolidone bromide ($C_{16}$MPBr) and 60 mmol $L^{-1}$ of 1,2-dihydroxybenzene (catechol). The authors characterize the microstructure variation of the aggregates between spherical and giant micelles with pH alteration by means of dynamic light scattering (DLS), cryogenic transmission electron microscopy (Cryo-TEM), fluorescence, nuclear magnetic resonance (NMR) and rheology. The authors present a graph of viscosity in the Newtonian plateau as a function of pH, in a range from 1 to 14. In this graph, a high viscosity is observed at pH 1, a decrease in viscosity until pH 7, where it reaches its minimum value, a maximum is observed at pH 9, followed by a further decrease in viscosity up to pH 12, followed by a change in the rate of decrease in viscosity to something less pronounced up to pH 14. The authors base their explanations for the pH responsiveness of the system and formation of different microstructures in the balance of protonation and deprotonation of hydroxyls attached to the aromatic ring. At very low pH values, small surfactant aggregates incorporate a portion of the catechol molecules, which have both protonated hydroxyl groups, as a result of the hydrophobic effect. Although these aggregates are relatively small, their high surface charge makes them rigid structures, conferring high viscosity to the solution. While at pH values close to 7, both hydroxyls are still mostly protonated, favoring smaller aggregates that confer low viscosity to the solution. Between pH values of 7 and 11, a hydroxyl is deprotonated, acquiring a negative charge which can partially neutralize the $C_{16}$MPBr, favoring the formation of giant micelles that form a viscous fluid. Finally, after pH 11, both hydroxyls are mostly deprotonated and the viscosity of the solution drops again, as the giant micelles are broken up. The system presented by this article must be improved for application as a diverter one, since the viscosity gain due to the increase in pH only occurs at pH values close to 7, which indicates that a high percentage of neutralization is required to reach its maximum efficiency. In addition, the fluid has high viscosity in very acidic media, which could make pumping unfeasible.

In the paper presented by J. Karayil's scientific paper, J Surface Deterg, entitled "Micellar Growth in Cetylpyridinium Chloride/Alcohol System: Role of Long Chain Alcohol", Electrolyte and Surfactant Head Group, 19 (2016) 849 to 860, the aim was to characterize the microstructure of systems consisting of cetylpyridinium chloride (CPC), potassium bromide (KBr) and long-chain alcohols ($C_n$OH, n=9 to 12), as a function of alcohol concentration, electrolyte and temperature. The authors also compared samples containing cetrimonium bromide (CTAB) and cetylpyridinium bromide (CPB). Rheology, cryogenic transmission microscopy (Cryo-TEM) and dynamic light scattering (DLS) analyzes were performed. It was pointed out that the presence of long-chain alcohols induces the growth of aggregates in the CTC/KBr system and, the longer the alcohol chain, the lower the concentration needed to promote this effect. In general, the increase in alcohol concentration leads to higher viscosities, which is commonly related to larger aggregates, until reaching a maximum concentration value. Above this specific concentration, small increases in alcohol concentration should lead to a decrease in viscosity. The increase in KBr concentration also induces the formation of larger aggregates. This invention makes use of different components for the formation of aggregates, but some physical-chemical phenomena presented are observed in the invention. This invention has the advantage of a better performance for acid recovery of carbonaceous wells due to the distinction in the rheological profile obtained, the composition of this invention is capable of varying its rheological properties in view of variations in the acidity of the medium, which allows the control of the flow of fluid improving the performance of the operation.

Patent application BR 112015027494-3 relates to a treatment fluid for use in a combined acidification and fracture treatment with proppants, the treatment fluid comprises: (A) an emulsion with: (i) an oil phase to be continued; (ii) a dispersed aqueous phase, which comprises: (a) water; and (b) a source of an acid; and (iii) an emulsifier; and (B) a proppant. A method of fracturing a treatment zone of a well, the method comprising the steps of: (i) forming a treatment fluid in accordance with the invention; and (ii) introducing the treatment fluid into the zone at a speed and pressure greater than the fracture gradient of the zone. The document discloses a treatment fluid composition comprising among other components a source of acid (HCl) and a polymeric viscosity increasing agent present in the aqueous phase. The concentration of the polymeric agent is not sufficient to make the viscosity of the aqueous phase greater than 10 cP. It is believed that the treatment fluid can act in a similar way to the fluid obtained in the present creation, that is, by increasing the apparent viscosity. The method comprises introducing the treatment fluid into the zone at a speed and pressure greater than the fracture gradient of the zone which essentially consists of controlled pumping, in practical terms. Unlike this invention, the use of the fluid described above is based on combined treatment, using acid and hydraulic stimulation, which must occur in two distinct stages. The fluid presented by the prior art document is an emulsion and must present some degree of instability, having its efficiency compromised. This invention is a system with thermodynamic stability, since the viscosity gain mechanism is based on the formation of transient structures that are responsive to the acidity of the medium (giant micelles). In addition, still differentiating the inventions, the viscosity profile of QuoVadis varies with the degree of attack of the matrix, as well as the stimulation mechanism and the viscosifying agent adopted in the QuoVadis system are different from those presented by document BR 112015027494-3. This invention has the advantages of being thermodynamically stable over BR 112015027494-3, as stated above. Fundamentally, the structures formed in the fluid described in the document BR 112015027494 are only kinetically stabilized, a system subject to phase separation as a function of time. The use of giant micelles ensures a rheological response to the fluid dependent on external stimuli, which leads to the enhancement of stimulation, achieving the rheological profile throughout the entire acid stimulation process. Also, QuoVadis has low viscosity when not neutralized, being easily pumped, and the same characteristic is observed after QuoVadis is neutralized at the end of treatment, facilitating pumping in the injection stage and during withdrawal. The transient aggregates break down at the end of the process, implying a decrease in fluid viscosity without the need to apply an emulsion breaker, such as the breaker; which may be registered as a QuoVadis product advantage.

The Brazilian patent PI 0312349-9 presents a non-polymeric fluid with reversible thickening properties that has low viscosity in strong acid, turning into a gel when the acid concentration is reduced even minimally, and which is subsequently decomposed by the acid. The compositions are based on an aqueous mixture of zwitterionic surfactants, inorganic acids and organic acids. The system is particularly used as a deflection or diverter agent for application in the treatment of damaged sandstones. For example, the fluid may be used prior to a matrix acidification treatment in a geological formation. The document discloses a self-diverter acidifying agent for use in the pre-treatment stage of sandstones, characterized by comprising a betaine as an acid-hydrolyzable surfactant capable of forming a viscoelastic gel. Unlike this invention, the prior art document claims surfactants such as betaines, which belong to a class of surfactants called zwitterionics, which is a class distinct from the class adopted in this invention. Organic molecules responsive to the variation of the acidity of the medium that act as co-solute were adopted to compose the Quovadis fluid, different from the product described above, since the document does not make claims about aromatic co-solutes enabling the aggregation in giant micelles in low concentrations of surfactant. The fluid described in the Brazilian patent PI 0312349-9 uses short-chain alcohols (methanol), molecules which are capable of destructuring aggregates formed by surfactants, even at very low concentrations, drastically reducing the viscosity of the fluid and consequently its efficiency in promoting diverter. Such types of molecules were carefully avoided in the composition of QuoVadis. Furthermore, the control of fluid rheology is not linked to surfactant degradation, but to the equilibrium of the carbonate neutralization reaction, which corresponds to a huge advantage for this invention, since this allows greater control of the stimulation and makes it impossible to the premature deactivation of the fluid caused by surfactant degradation. Another advantage that may be indicated is related to the deactivation mechanism of this invention, it does not involve the degradation of the surfactant, allowing the fluid to viscosify again when in contact with a region not yet treated.

US 20040152604 relates to a diverter acid fluid comprising at least one surfactant, at least one quaternary amine polyelectrolyte, water and a non-aqueous solvent, in which the quaternary amine is capable of reacting with the surfactant, so that at least one polyelectrolyte has the general formula of:

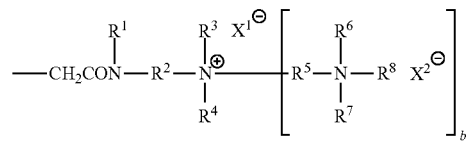

wherein b is between 2 and 8; $R^1$ is hydrogen or methyl; $R^2$ is a divalent alkylene group having 2 to 20 carbon atoms; $R^3$, $R^4$, $R^6$, $R^7$ and $R^8$ are independently selected from alkyl groups having 1 to 4 carbon atoms; $R^5$ is a divalent alkylene group substituted or unsubstituted with 2 to 5 carbon atoms; and $X^1$ and $X^2$ are anions. The patent document US 20040152604 refers to several alternative compositions for the viscoelastic fluid, but the viscosity gain mechanism is based on the formation of aggregates called vesicles. The described method for stimulation comprises a stimulation pack injected into the formation, followed by the optional pumping of a spacer fluid, followed by the pumping of an acidic fluid. The injection procedure takes place by pumping the fluid in its viscous state and in an alkaline medium. Viscosity loss occurs when the fluid is degraded on contact with acid, which is injected at a later stage; therefore, the fluid does not change its rheology upon reaction with the rock matrix. It may be noted some similarities between the technology described by the document US 20040152604 and this invention, such as the presence of cellulose-based polymers as additives and the fact that the rheological properties of the fluid may be adjusted by varying its pH, but the solution reaches high viscosity values only at very alkaline pH values, in a range of 9 to 12. Several differences between the technology described in the patent document US 20040152604 and this invention may be highlighted. For example, the type of aggregate responsible for fluid viscosity gain, which are vesicles in the prior art document and giant micelles in QuoVadis. These structures have considerably different properties and rheological responses. The composition of the fluids also differs from each other. The system described above claims several surfactants, although it prefers lecithin, a two-fall zwitterionic surfactant. The use of modified polyelectrolytes, as well as the presence of non-aqueous solvents, also differentiate the proposed systems. For the fluid of the document US 20040152604, a breaker must be used to guarantee the destructuring of the vesicles, promoting the "breaking" of the system. The fluid present in the document is not injected together with the acid, requiring acid fronts to be later pumped; therefore, it is clear that the stimulation mechanism does not resemble the method adopted in the QuoVadis system. Still on the diverter action method, the responsiveness to acidity variations occurs with the viscosity gain at alkaline pH values, distinguishing the products in question from the optimal performance window of the fluids used for stimulation. QuoVadis proves to be a more advantageous product in terms of performance, in addition to presenting a simpler formulation, being formed with a smaller number of components.

In order to understand the functioning of diverter fluids, a study of the structures that guarantee their behavior is necessary, in many diverter fluids such structures are composed of surfactants. Surfactants generally have a hydrophobic and a hydrophilic region. The hydrophilic group may be non-ionic or ionic in nature, the second class being subdivided into cationic, anionic and even zwitterionic surfactants (surfactants that have both charges in their structure). The hydrophobic part may be composed of one or more saturated or unsaturated aliphatic hydrocarbon chains.

The addition of surfactant in solution causes the molecules to adsorb preferentially at interfaces (both liquid-air and liquid-container) and therefore are widely used as interfacial tension reducing agents even at low concentrations. The increase in surfactant concentration leads to the formation of aggregates and, when above the critical micelle concentration (cmc), the process occurs spontaneously. The morphology of these aggregates depends on the nature of the surfactant, as well as on the physicochemical parameters of the medium. The most common structure is spherical, but more complex aggregates may be obtained in the case of increased concentration, variation of ionic strength, pH and temperature stimuli.

The morphology of the aggregate may be understood based on the critical packing parameter of the surfactant, cpp (critical packing parameter), which is a ratio between the volume of the hydrophobic part and the hydrophilic part of the surfactant molecule that makes up the aggregate. When $cpp<⅓$, spherical micelles are expected to form. If $⅓>CPP>½$, the formation of elongated micelles and hexagonal structures is expected. If $½>cpp>1$, vesicle formation is expected. Although not part of the scope of work, lamellae and reverse structures may be expected when $cpp \sim 1$ and $>1$, respectively. In this invention, the entire development was based on fundamentals and aspects related to specific types of aggregates, among which the giant micelles stand out.

A self-aggregation structure highlighted for the invention are the giant micelles which are elongated aggregates that can reach thousands of nanometers under favorable conditions. The formation of this type of aggregate may be observed in solutions of pure surfactants at high concentrations. However, a more common strategy, efficient even at very low concentrations, is to form them by combining ionic surfactants with additives called hydrotopes. Hydrotopes are small molecules that have some similarities to surfactants, but do not form micelles; but, like surfactants, they cause increased solubility of hydrophobic compounds and have surface activity. The addition of hydrotopes in solutions containing cationic surfactants may favor the formation of giant micelles. In this case, the repulsion between the surfactant molecules decreases in the presence of the oppositely charged hydrotope, due to its insertion between the cationic heads. Thus, with the insertion of these molecules, a variation of the micellar curvature occurs, resulting in an increase in the CPP of the aggregate and allowing the formation of giant micelles. Solutions containing giant micelles may be viscoelastic depending on their composition and the physicochemical properties of the system, that is, they can present properties of viscous and elastic materials simultaneously.

For cases where hydrotopes are needed to favor the formation of giant micelles, it is possible to attribute a certain responsiveness to transient aggregates, based on the nature of the inserted molecule. In this way, solutions that present different rheological responses to different external stimuli may be prepared. There are records of systems in which rheological control of the solution may be obtained due to the presence of giant micelles that can form or break down with the incidence of light with a specific wavelength, with variations in temperature, pH, presence of specific metal ions, gas solubilization, among other stimuli. It is worth mentioning that, in some cases, with specific surfactants these rheological responses are observed even in the absence of hydrotope.

As previously described, the strategy for the formation of giant micelles that is commonly adopted, reported and consists of the addition of a hydrotope to ensure minimization of electrostatic repulsion, in addition to promoting interactions of a hydrophobic nature and p-cation, for example. Mostly, the literature reports ternary systems, which consist of the combination of water, surfactant and one of these hydrotopes. Thus, the responsiveness of these systems is limited to the characteristics of the surfactant and the hydrotope molecule. However, there is interest in modulating the responsiveness of these solutions to different stimuli, such as temperature, pH, light and ionic strength.

One of the applications of giant micelle systems is in increasing oil well production or enhanced oil recovery (EOR). Interesting characteristics, such as: high viscosity, stability at low pH values, stability at high pressures and temperatures, the ability to respond to different stimuli by modifying their state of aggregation and their rheological properties, make giant micelles strong candidates for this application. In fact, by slightly modifying the system that forms the giant micelles or the physical-chemical environment, it is possible to modify the size, shape and properties of these aggregates. Thus, systems containing mixtures of giant micelles, polymeric surfactants and polymers in solution are strong candidates to increase the efficiency of processes applied in areas of advanced recovery, due to the intrinsic ability to increase the viscosity of the medium, enabling it to act as a diverter.

Commonly, carbonaceous reservoirs show high heterogeneity in terms of porosity and permeability. Pumping a fluid into a well will cause the fluid to permeate into the rock matrix. Inevitably, the path taken will be associated with and least resistance, as predicted by Darcy's law. However, as it is a reactive fluid, an acidic agent must change the characteristics of the rock matrix, making it more porous and more permeable. This means that the same region will be subject to stimulation throughout the process. Diverter and self-diverter fluids are used to circumvent this issue, their action is based on controlling the flow of virgin fluid through a momentary decrease in the local permeability of the matrix. With the advance of the reaction between the acid and the carbonate of the rock matrix, the physical-chemical environment is altered and, as previously described, diverter systems must respond to these variations. In this case, it is expected that the aggregates will be formed and the viscosity of the fluid will be increased in that certain newly stimulated zone. As a consequence, this zone is no longer easily accessed, displacing the subsequent fluid to a new region, guaranteeing a complete treatment.

In view of the above, it would be useful if the technique had a diverter acid fluid composition capable of responding rheologically to external stimuli such as variations in temperature, pressure, composition and acidity of the medium. This invention proposes a composition comprising quaternary amines acting as surfactants, aromatic responsive molecules acting as co-solute and at least one additive of the organic, polymeric salt or alcohol type in order to improve the stability and performance of the fluid. It is possible to develop several modalities of this invention by slightly modifying the composition, in order to change rheological properties and adapt the composition seeking better results for the acid stimulation process.

BRIEF DESCRIPTION OF THE INVENTION

This invention relates to a diverter acid fluid composition for use in stimulating oil wells during their exploration, called Quovadis.

The diverter aqueous acidic fluid composition for use during oil well exploration comprises:
  0.1 to 0.75 mol $L^{-1}$ of cationic surfactants, preferably quaternary amines, of general formula I,

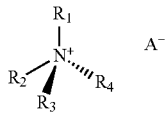

where A is a negative group, $R_1$, $R_2$, $R_3$ and $R_4$ may be hydrogen, straight or branched, short (1 to 5 carbon atoms) or long (up to 30 carbon atoms), saturated or unsaturated, aliphatic groups;
  0.1 to 0.75 mol $L^{-1}$ of an aromatic molecule that acts as a co-solute, of general formula II,

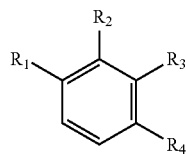

where $R_1$, $R_2$, $R_3$ and $R_4$ may be hydrogen, aliphatic chains or a functional group responsive to changes in acidity of the medium selected from: hydroxyl, carboxyl, amine, amide, boranes, borates, phosphates, thiols, tosylates, sulfates, sulfonates, sulfite and the respective salts thereof;
  at least one additive that may be of the inorganic, polymeric and/or alcohol salt type;
  2 to 30% mass/mass of an inorganic acid.

At least one of the groups of the surfactant, generically represented by $R_1$, $R_2$, $R_3$ and $R_4$, in the general formula I, is a linear or branched, long-chain (from 9 to 30 carbon atoms), saturated or unsaturated, aliphatic group.

The composition may consist of a mixture of surfactants having general formula I.

The aromatic co-solute has at least one, and at most 3, pH-responsive functional groups (generally represented in the general formula II by $R_1$, $R_2$, $R_3$ and $R_4$) chosen from: hydroxyl, carboxyl, amine, amide, boranes, borates, phosphates, thiols, tosylates, sulfates, sulfonates, sulfites and the respective salts thereof. Preferably the aromatic co-solute has two carboxyls in the ortho and/or meta and/or para positions, or the respective salts thereof.

The composition may consist of a mixture of aromatic molecules having general formula II.

The additive may be one or more polymers, comprise a concentration between 0.01 to 5% mass/mass and be selected from:
  Nonionic polymers: poly(acrylamide), poly (methacrylamide), poly(lactic acid), poly(vinylacetate), poly(vinylpyrrolidine), poly(vinyl alcohol), poly(ethylene glycol), poly(methyl methacrylate), poly (propylene glycol), poly(propylene glycol)-block-poly(ethylene glycol)-block-poly(propylene glycol);
  Ionic polymers: poly(acrylamide-co-acrylic acid), polydiallyldimethylammonium chloride, poly(acrylic acid) and the respective salts thereof;
  Cellulose-based polymers: cellulose, starch, hydroxypropylmethylcellulose, hydroxyethylcellulose, hydroxymethylcellulose and hydrophobically modified hydroxymethylcellulose.

The additive may also be one or more straight or branched chain alcohols, having from 3 to 15 carbon atoms and comprising a concentration between 0.05 to 50 mmol $L^{-1}$.

The additive may be one or more inorganic salts with a concentration between 0.5 to 50 mmol $L^{-1}$ selected from sulphides, chlorides and bromides of: sodium, magnesium, potassium, calcium, iron, copper and barium.

The inorganic acid may be selected from hydrochloric, sulfuric, sulfonic, sulfamic, hydrofluoric, acetic, formic, chloroacetic acid and mixtures thereof.

BRIEF DESCRIPTION OF THE FIGURES

FIGS. 2a-2f show the viscosity at standby, at 10 $s^{-1}$ and 100 $s^{-1}$ as a function of the percentage of neutralization with Ca(OH)$_2$ at 25° C. for the diverter QuoVadis generation (G) 1, 2 and 3 in their different compositions and commercial diverters (DC) 1, in their different batches, A, B and C, and 2. In all graphs, the scales were kept to facilitate comparison.

DETAILED DESCRIPTION OF THE INVENTION

Figure 1:
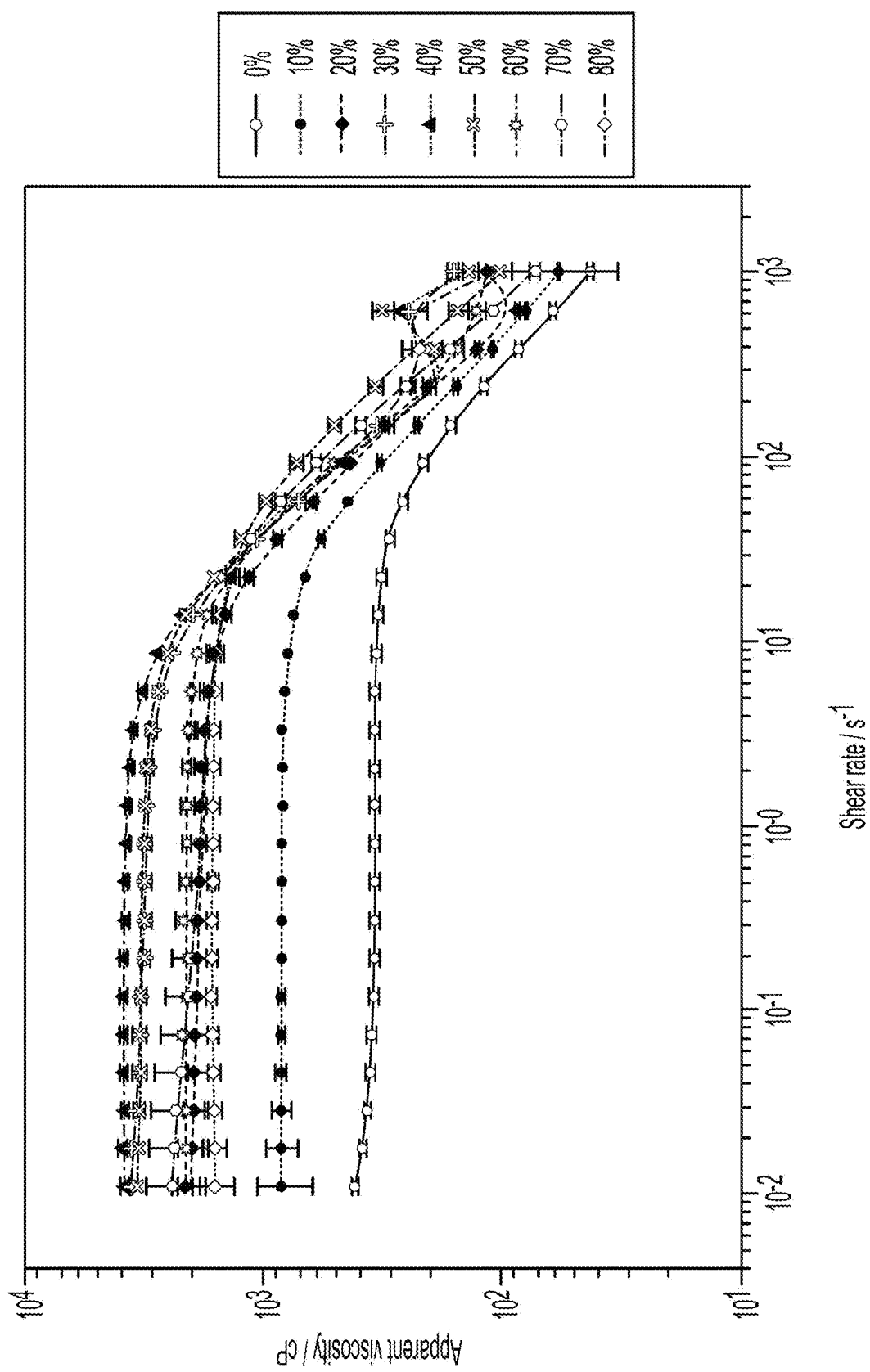
FIG. 1 is a flow curve, graph representing the apparent viscosity as a function of shear rate, for QuoVadis samples with different percentages of neutralization performed with Ca (OH)$_2$, indicated by the colors in the legend (0 to 80%). Tests carried out at 25° C. The lines only indicate guide for the eyes.
Figure 2A:
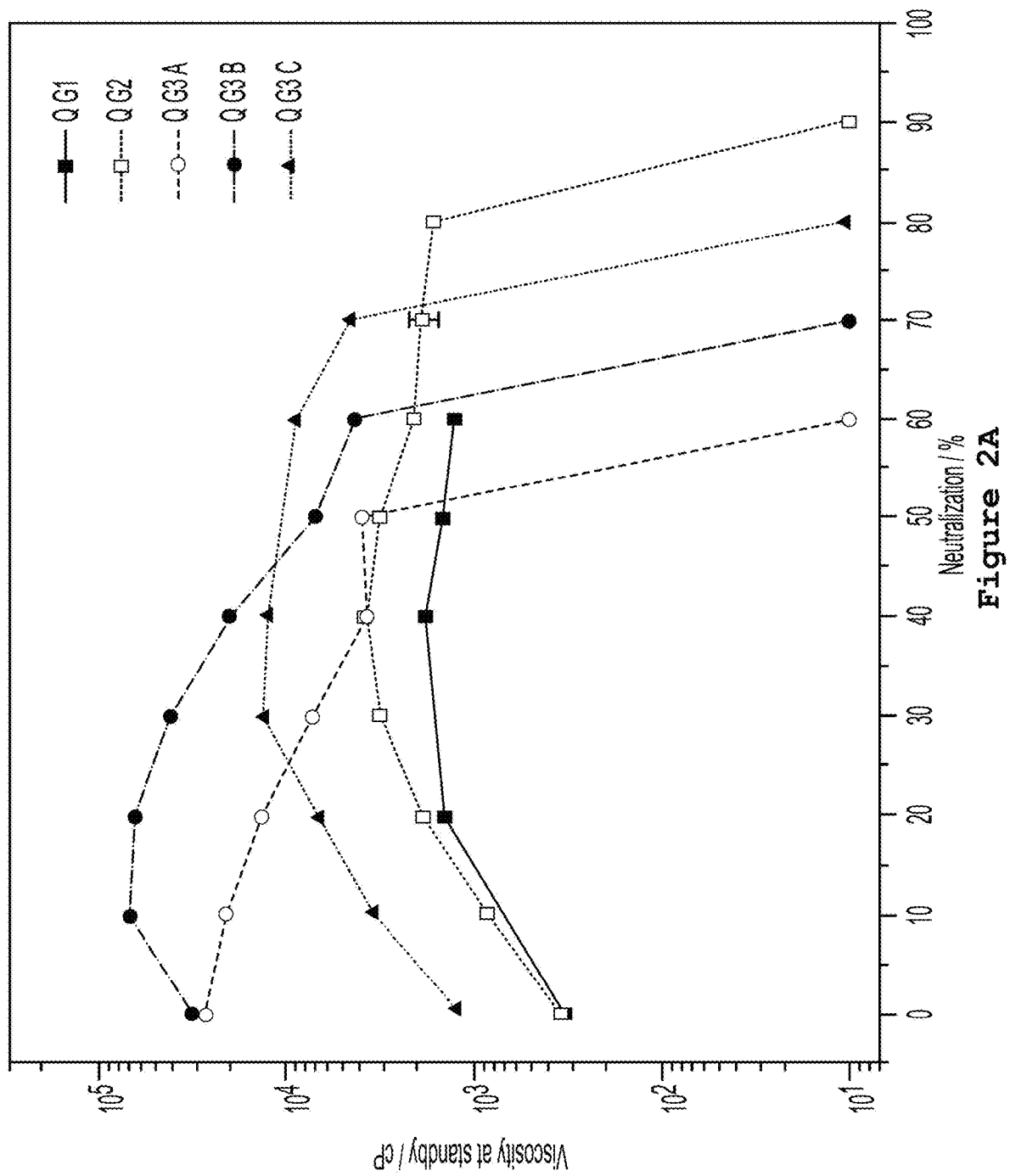
Figure 2B:
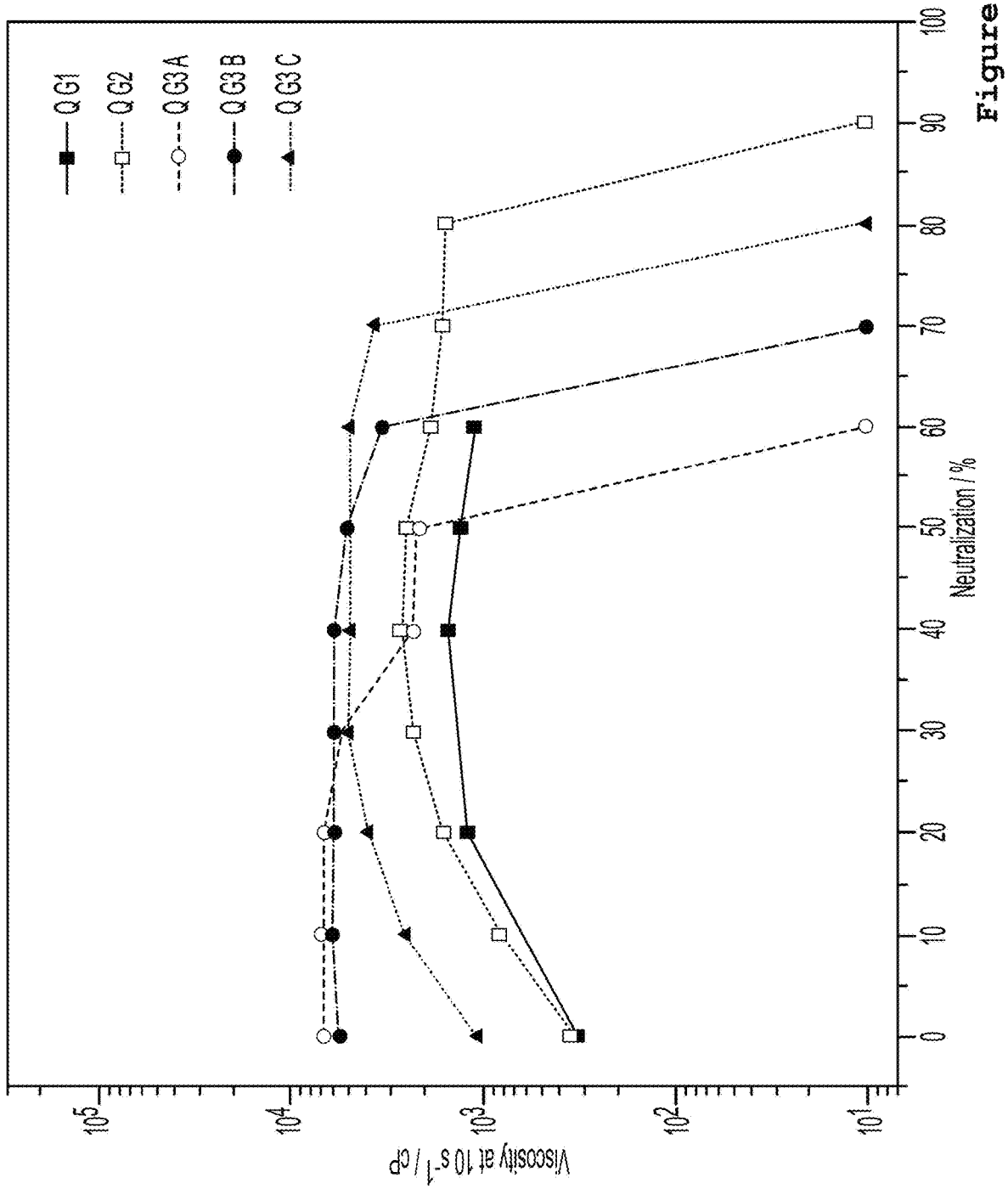
Figure 2D:
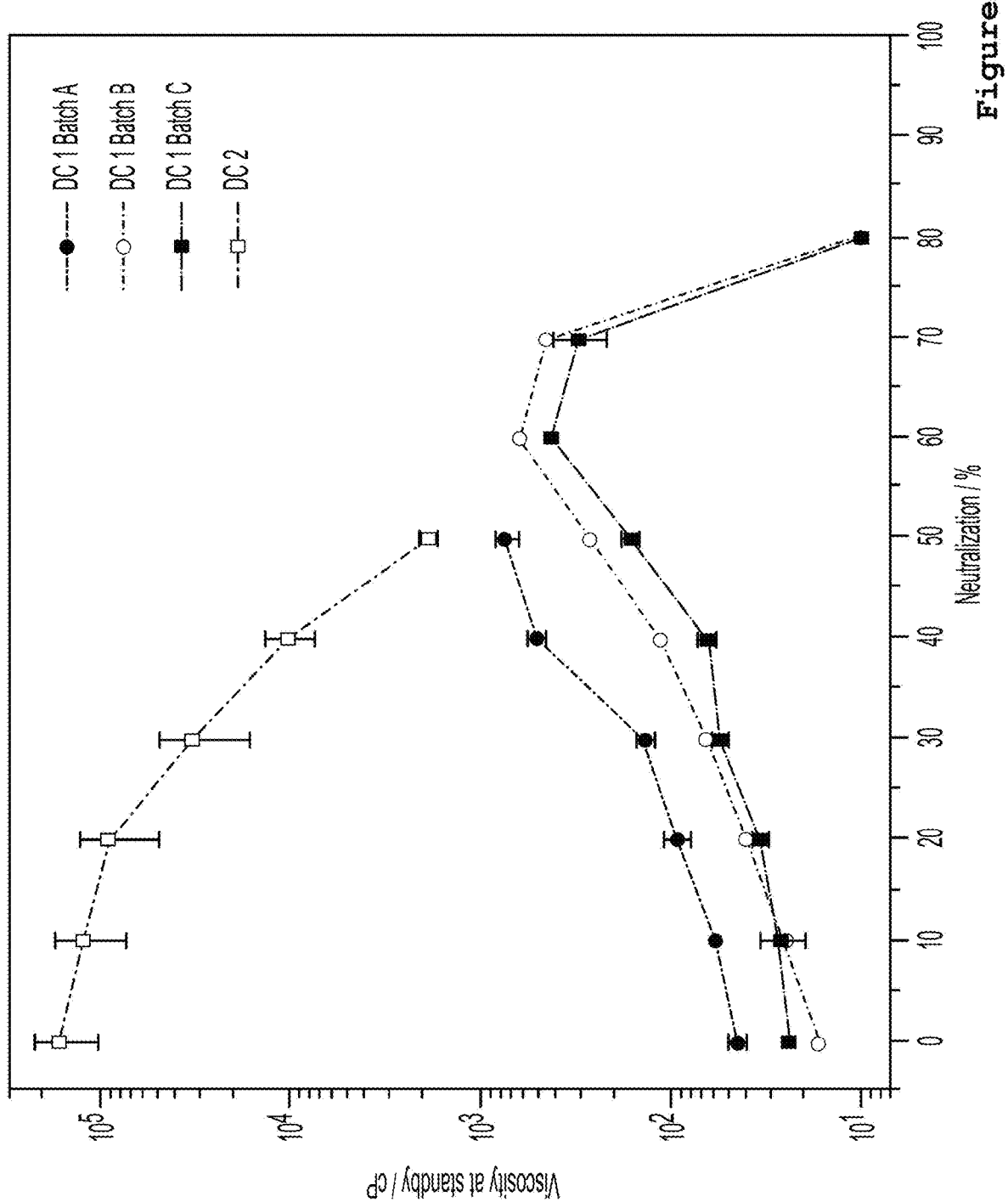
Figure 2E:
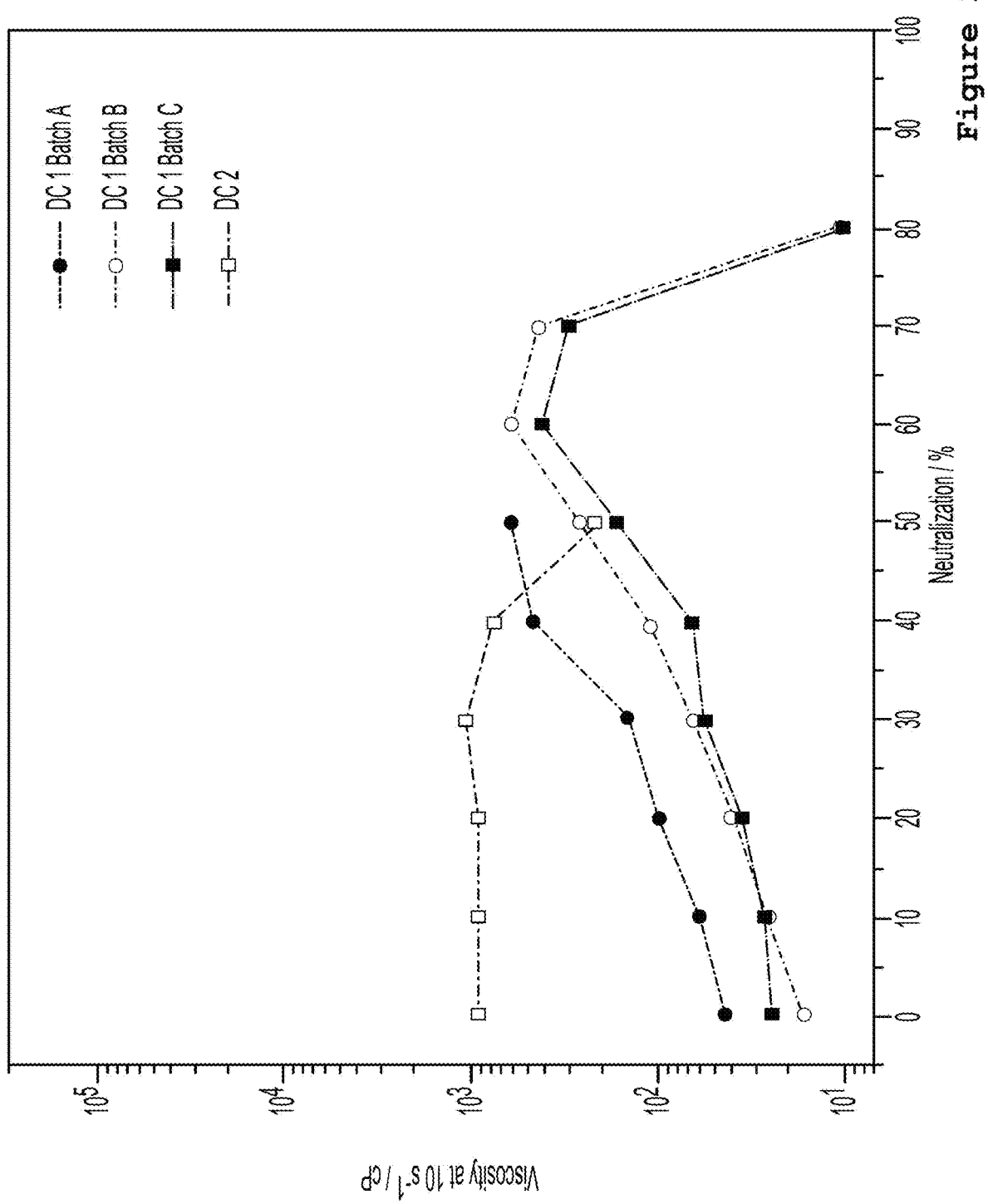
Figure 2F:
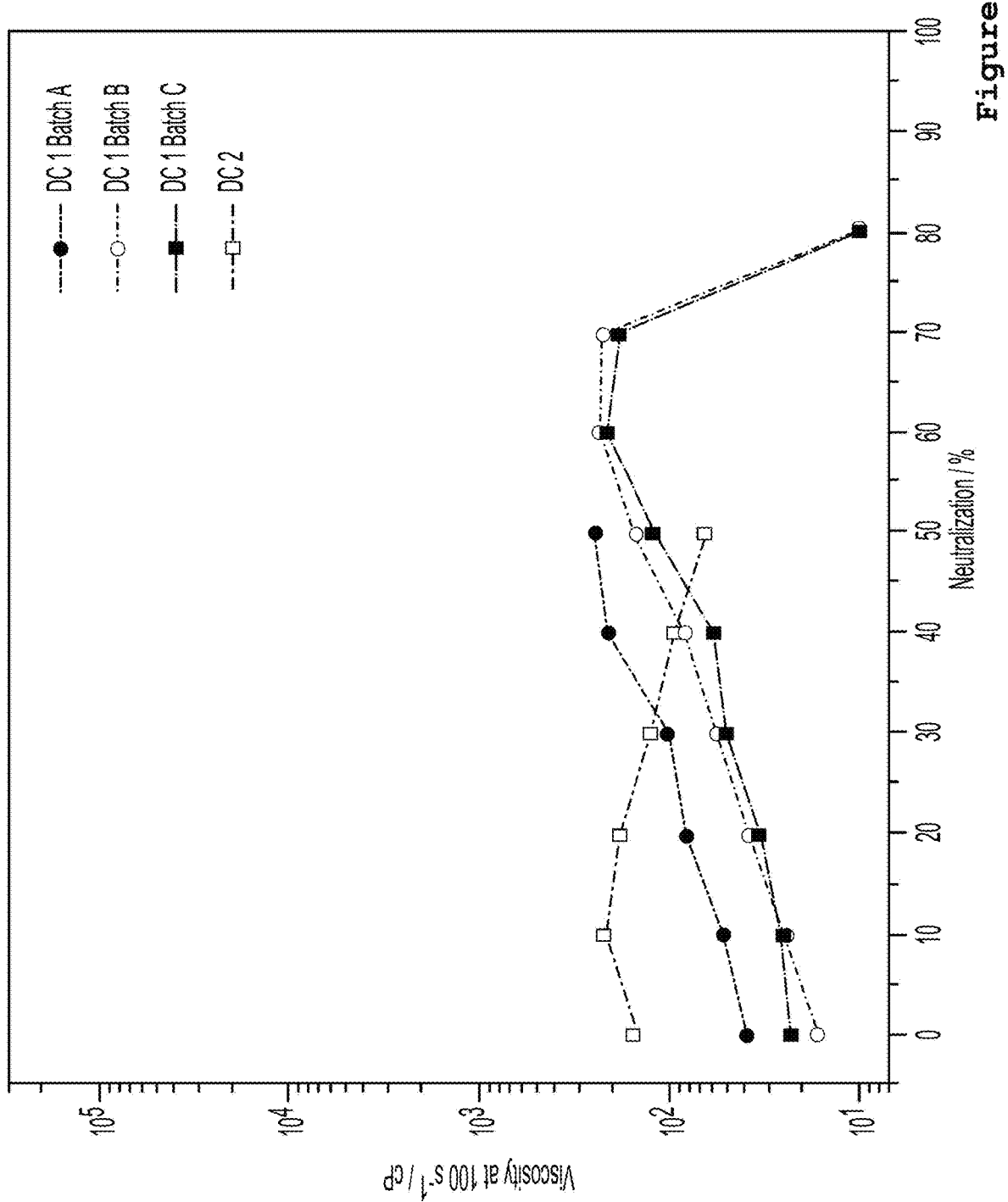

This invention relates to a diverter acid fluid composition for use in stimulating oil wells during their exploration.

The diverter aqueous acidic fluid composition for use during oil well exploration comprises:

0.1 to 0.75 mol $L^{-1}$ of cationic surfactants, preferably quaternary amines, of general formula I,

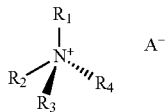

where A is a negative group, $R_1$, $R_2$, $R_3$ and $R_4$ may be hydrogen, straight or branched, short (1 to 5 carbon atoms) or long (up to 30 carbon atoms), saturated or unsaturated, aliphatic groups;

0.1 to 0.75 mol $L^{-1}$ of an aromatic molecule that acts as a co-solute, of general formula II,

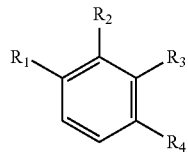

where $R_1$, $R_2$, $R_3$ and $R_4$ may be hydrogen, aliphatic chains or a functional group responsive to changes in acidity of the medium selected from: hydroxyl, carboxyl, amine, amide, boranes, borates, phosphates, thiols, tosylates, sulfates, sulfonates, sulfite and the respective salts thereof;

at least one additive that may be of the inorganic, polymeric and/or alcohol salt type;

2 to 30% mass/mass of an inorganic acid.

At least one of the groups of the surfactant, generically represented by $R_1$, $R_2$, $R_3$ and $R_4$, in the general formula I, be a long-chain (from 9 to 30 carbon atoms), linear or branched, saturated or unsaturated, aliphatic group.

The composition may consist of a mixture of surfactants having general formula I.

The aromatic co-solute has at least one, and at most 3, pH-responsive functional groups (generally represented in the general formula II by $R_1$, $R_2$, $R_3$ and $R_4$) chosen from: hydroxyl, carboxyl, amine, amide, boranes, borates, phosphates, thiols, tosylates, sulfates, sulfonates, sulfites and the respective salts thereof. Preferably the aromatic co-solute has two carboxyls in the ortho and/or meta and/or para positions, or the respective salts thereof.

The composition may consist of a mixture of aromatic molecules having general formula II.

The additive may be one or more polymers, comprise a concentration between 0.01 to 5% mass/mass and be selected from:

Nonionic polymers: poly(acrylamide), poly (methacrylamide), poly(lactic acid), poly(vinylacetate), poly(vinylpyrrolidine), poly(vinyl alcohol), poly(ethylene glycol), poly(methyl methacrylate), poly (propylene glycol), poly(propylene glycol)-block-poly(ethylene glycol)-block-poly(propylene glycol);

Ionic polymers: poly(acrylamide-co-acrylic acid), polydiallyldimethylammonium chloride, poly(acrylic acid) and the respective salts thereof;

Cellulose-based polymers: cellulose, starch, hydroxypropylmethylcellulose, hydroxyethylcellulose, hydroxymethylcellulose and hydrophobically modified hydroxymethylcellulose.

The additive may also be one or more straight or branched chain alcohols, having from 3 to 15 carbon atoms and comprising a concentration between 0.05 to 50 mmol $L^{-1}$.

The additive may be one or more inorganic salts with a concentration between 0.5 to 50 mmol $L^{-1}$ selected from sulphides, chlorides and bromides of: sodium, magnesium, potassium, calcium, iron, copper and barium.

Inorganic acid may be selected from hydrochloric, sulfuric, sulfonic, sulfamic, hydrofluoric, acetic, formic, chloroacetic acid and mixtures thereof.

In view of the difficulties for an efficient diverter and some of the commercially available options, the research group from the State University of Campinas developed a diverter acid fluid in partnership with PETROBRAS, named QuoVadis. The product is under constant optimization, and, in the current generation, it already has features that stand out a lot when compared to commercially available ones.

The invention differs from other diverter acid fluids in its output, its performance and composition, which is based on a family of surfactants that is not commonly adopted in the formulation of other diverter acid fluids. A specific molecule, called co-solute, enables the structuring of the aggregates responsible for the variation in the viscosity of the medium. Another important feature regarding the complexity of the fluid composition is the presence of additives, inorganic salts, polymers and alcohols, are added to the mixture in order to improve the results obtained and adapt the fluid to industrial use.

When mentioning difference in output, it is said that this invention presents superior rheological results when compared to commercial products, results which were obtained for the qualification of the embodiments of the invention. Among the embodiments of the invention, different generations of QuoVadis, different rheological profiles were obtained that surpass commercial products with regard to the magnitude of viscosity, the percentage of neutralization in which the system is viscosified, the effective neutralization range that the fluid promotes divergence and neutralization percentage where the fluid loses viscosity.

Another important feature of this invention is the absence of a substance that acts as a breaker, several compositions described in the state of the art make use of substances intended to break up the aggregates formed by the diverter fluid in order to recover the permeability of the medium. Making the medium fluid again is important so that formation damage does not occur, and the injection of a breaker should make the process more expensive, since they are usually complex and expensive molecules and add steps to the recovery process. Breaking agents can also make the process less efficient; since, in the event that these agents fail to decrease the viscosity of the diverter fluid, part of the fluid will not be recovered and may thus damage the formation. QuoVadis, the fluid of this invention, does not use any type of breaker, all rheological variations are promoted by variations in the balance of the reaction between the carbonate of the formation and the acid present in the formulation. Thus, inevitably, QuoVadis will lose viscosity. As all variations are based on an equilibrium, a certain reversibility is given to the product, so that the fluid has an extended useful time of action, since it can go back to viscosification, if it finds a region that meets the physicochemical requirements.

The functioning mechanism of QuoVadis is based on the formation of supramolecular structures formed under specific conditions; that is, it is expected that such aggregates will be formed mostly in regions where diverter is desired. QuoVadis has low viscosity when it is virgin or in low neutralizations, under these conditions, small aggregates of relatively organized structures are formed that are little opposed to the flow, promoting a simple viscosity gain. As the neutralization reaction progresses, that is, a shift from equilibrium to the products, the maximum viscosity of the system is reached, as evidenced by the formation of a gel. The architecture of aggregates in solution undergoes several changes, where the growth of the aggregates present until the formation of a tangled network of giant micelles is evident. Aggregate growth occurs due to incorporation of acid-responsive aromatic co-solute molecules into the micellar structure. These co-solutes acquire charges with changes in acidity, according to their respective balances of protonation and deprotonation, favoring the incorporation of a larger fraction of such molecules in the body of the aggregates, as a result of the decrease in their surface charge. When the consumption reaction of the carbonate matrix is advanced, indicating high consumption of acid, QuoVadis has its viscosity reduced, which points to the extinction of the giant micelles. In fact, some factors can lead to the destruction of the aggregates with the increase of the local pH. One of these factors is associated with an increase in the solubility in aqueous media of a component of the system, as a result of changes in its structure. Another factor to be mentioned is the destabilization of the aggregates caused by the formation of new charged species, characterized as a product of the reaction between the acid and the rocky matrix, modifying the ionic strength of the medium.

Briefly, the inventiveness of the formulation claimed by this document lies around the following factors:

- The composition has the potential to achieve more advantageous results for oil production, as it is a fluid capable of providing different rheological responses to external stimuli;
- The acid fluid undergoes an increase in viscosity in regions where the reaction between the acid and carbonate occurs, improving the fluid diverter in the well, in favor of areas of lower permeability, thus maximizing the treatment coverage and consequently the result of the operation;
- The acid composition has a quaternary amine surfactant, aromatic co-solute and different additives;
- The formulation does not require the addition of a breaking agent, reducing the number of steps for treatment.

To study, characterize and compare the developed fluid with commercial fluids, several laboratory tests were performed. The rheological tests were carried out following the same procedure on a HAAKE MARS 40 rheometer, in order to determine the rheological properties of the different compositions claimed by this invention in view of variations in composition, acidity and temperature to which the samples were subjected. FIG. 1 shows flow curves for Quo Vadis samples, where the variation of apparent viscosity as a function of shear rate may be observed. Flow curves provide important information regarding the rheological properties of the system, which will be discussed below. It is important to evaluate the rheological behavior of an acidity-responsive diverter against its neutralization. For this, this evaluation may be done through the fluid viscosity profile, and this profile is a graphic representation of the apparent viscosity of a solution, at a given shear rate, as a function of the neutralization percentage. With this, it is possible to compare information on the behavior of the fluid throughout its application, when it is subjected to different neutralization conditions, as a result of the attack on the carbonaceous rock matrix, or different shear rates as a result of the flow caused by the pumping. FIGS. 2a-2f present the graphs of viscosity profile as a function of neutralization, it was obtained with the compilation of data from different fluids studied.

As can be seen in FIG. 1, all flow curves obtained present the same rheological profile; therefore, the interpretations are similar. The flow curves obtained are characteristic of non-Newtonian fluids, more specifically as pseudoplastics, where the apparent viscosity passes through a region with constant values and then varies downwards as the shear rate increases. Two distinct regions can be seen for these samples. The first one is located at lower shear rates and characterizes a Newtonian behavior, because in this plateau the viscosity (h) does not vary with the shear rate (g), which is called the Newtonian plateau and is where the system has the highest value for viscosity. The second region occurs after the shear rate reaches a threshold value, a characteristic thinning point for the system. At this stage, the structures are no longer able to resist the flow and align with the shear field, thus failing to offer resistance to the flow, which results in a decrease in apparent viscosity.

The characteristic behavior of pseudoplastics comes from the microstructure of the system. Due to the structuring of its constituents, the material is able to store part of the energy provided by the shear, resisting the flow with an elastic behavior, forming the Newtonian plateau. We can infer that the system architecture is more complex and contains larger and more tangled structures in samples with neutralization percentages equal to 30%, 40% and 50%, and smaller and less complex structures in samples with neutralization equal to 0% and 10%, this is because the plateau viscosity decreases in this order for these samples. However, the order of these samples is reversed when evaluating the thinning threshold stress, samples with less complex structures are able to respond elastically over a wider window of shear rates before aligning with the flow.

Figure 3:
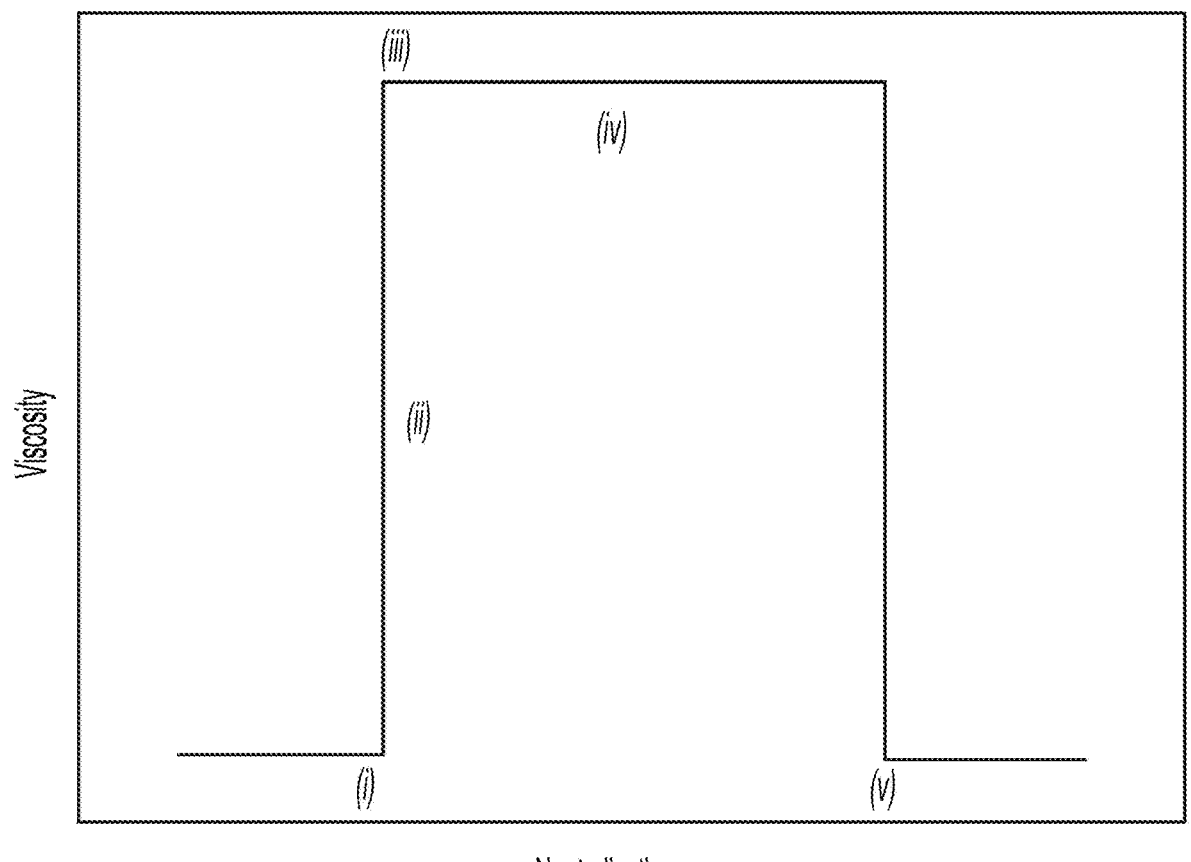
FIG. 3 is a schematic representation of the ideal rheological profile for an efficient diverter fluid. It represents the five main parameters observed in the evaluation of the effectiveness of a diverter, these are: (I) percentage of neutralization where the fluid reaches its maximum viscosity; (II) comparison of the maximum viscosity ($h_{max}$) in relation to the initial viscosity of the fluid ($h_0$), represented by the ratio $h_{max}/h_0$; (III) nominal value of the modulus of the maximum viscosity reached, in cP; (IV) range of percentage of neutralization in which the diverter maintains its maximum viscosity; (V) percentage of neutralization where the fluid loses viscosity.

Through rheological tests, the efficiency of a diverter may be discussed in terms of five main characteristics, represented in FIG. 3: (I) percentage of neutralization where the fluid reaches its maximum viscosity; (II) comparison of the maximum viscosity ($h_{max}$) in relation to the initial viscosity of the fluid ($h_0$), represented by the ratio $h_{max}/h_0$; (III) nominal value of the maximum viscosity modulus reached, in cP; (IV) range of percentage of neutralization in which the diverter maintains its maximum viscosity; (V) percentage of neutralization where the fluid loses viscosity.

Discussing the five points independently and in detail:

(I) Percentage of neutralization where the fluid reaches its maximum viscosity: this aspect of the neutralization curve represents the percentage at which the fluid reaches its maximum capacity to promote diverter. Although this value does not represent the neutralization percentage at which the fluid starts its viscosity gain, as well as the neutralization percentage where the diverter process starts, the more this value is shifted to lower neutralization percentages, the smaller the amount of carbonate that must be consumed by the fluid so that it reaches its maximum potential to promote diverter, indicating a more efficient diverter. There is a proviso for the lower limit of this parameter for the fluid to be considered ideal. It is not desirable for the fluid to reach its maximum viscosity at very low neutralization percentages or close to 0%, as it is necessary for the diverter process to occur after the fluid has permeated a minimum distance in the matrix.

(II) Comparison of the maximum viscosity ($h_{max}$) in relation to the initial viscosity of the fluid ($h_0$), represented by the ratio $h_{max}/h_0$: is related to how much a fluid can increase its viscosity when neutralized by formation, that is, the potential of the fluid to change the local permeability of the well. The higher this value, the greater the gain in fluid viscosity in relation to the initial viscosity, as it is partially neutralized by the matrix. A high value for this parameter represents a fluid with a large gain in viscosity, reflecting a great potential for promoting diverter. When this parameter has a value equal to 1 the fluid has maximum viscosity when it is virgin, 0% neutralization. For values greater than 1, there is an increase in viscosity and for values less than 1, the initial viscosity of the diverter is greater than any value reached later.

(III) Nominal value of the maximum viscosity modulus reached, in cP: the importance of this parameter is due to the intense flow used during the application of these fluids in the well. It is necessary for the fluid to be able to reduce the flow of virgin fluid locally for the diverter to occur, for this the viscosity modulus obtained after the fluid is partially neutralized by the matrix must have a high value. It may be said that the higher this parameter, the more efficient the diverter.

(IV) Range of percentage of neutralization in which the diverter has a viscosity greater than or equal to 70% of the maximum viscosity value ($h_{max}$): the fourth parameter, in general, refers to the ability of the fluid to remain viscous with the advance of its neutralization promoted by the reaction of decomposition of the rock. It reflects the competence of the fluid to consume carbonate without its rheological properties changing drastically, losing viscosity, which impairs the diverter performance. The diverter process is not limited to this neutralization window, but links may be established between the period when fluid is able to efficiently promote divergence and the fourth parameter. In a way, it is expected that the longer the range of this parameter, the longer the time that the fluid promotes flow resistance, being more efficient in remaining efficient to cause divergence.

(V) Percentage of neutralization where the fluid exhibits a drastic loss of viscosity: this parameter is quite simple, it represents the point at which the fluid loses its rheological properties responsible for promoting divergence. The product must allow flow to reestablish itself at some point in the treatment for it to be effective, but a premature drop in viscosity reduces the efficiency of divergence. Therefore, it is preferable that the diverter show a high percentage of neutralization before becoming fluid again.

It is relevant to point out that when evaluating the efficiency of a diverter fluid through these parameters, the entire set of results obtained must be taken into account, and not just the parameter values in isolation. With this in mind, the rheology of the fluids shown in FIGS. 2a-2f have several points where QuoVadis is superior to commercial fluids, especially at high shear rates, taking into account the five points highlighted above. At standby, in the first generation of QuoVadis, there is a noticeable increase in viscosity with the neutralization, reaching the maximum viscosity in a percentage of neutralization equal to 40%. The same parameter for commercial diverter 1 only occurs in 60%. After reaching maximum viscosity, QuoVadis maintains its viscosity up to 60% neutralization, a characteristic that was not observed for any of the commercial diverters. Also, the maximum viscosity modulus is much higher when compared to DC 1. Still seeing the possibility of improvements in QuoVadis, the second generation of QuoVadis is proposed, where the $\eta_{max}/\eta_0$ ratio was increased, the percentage where the maximum viscosity occurs was maintained, the neutralization range was considerably expanded where the QuoVadis maintain their maximum viscosity practically constant, from 40 to 80%, and the maximum viscosity modulus has been increased. The second generation of QuoVadis is already a fluid far superior to commercial fluids in the different points raised, but with the aim of proposing a disruptive and even cheaper diverter acid fluid than those commercially available, the third generation of the Quo Vadis diverter and its derivatives, A, B and C were developed. QuoVadis G3 A would be an alternative for DC 2, while QuoVadis G3 B and C could be an alternative for DC 1.

Comparing initially the DC 2 with the QuoVadis G3 A, several points may be highlighted, especially at high shear rates. At standby, the initial viscosity of DC 2 starts higher than QuoVadis G3 A; however, it decays faster with neutralization and, at 50% neutralization, the QuoVadis viscosity becomes higher than that of DC 2. With shear, the viscosity of DC 2 drops dramatically and in 10 s$^{-1}$ per more than the two fluids have the same behavior, where the viscosity does not increase with neutralization and remains constant until at least 20% neutralization, the viscosity of QuoVadis is more than 6 times higher than the viscosity of DC 2. In 100 s$^{-1}$, while QuoVadis G3 A keeps the viscosity practically constant up to 50% neutralization, DC 2 shows a slight increase in viscosity by 10% where it then decays. Furthermore, the viscosity of QuoVadis is almost 4 times higher than that of DC 2 at this shear rate.

The comparisons of the DC 1 with the QuoVadis G2, G3 B and G3 C are even more interesting. At standby, the viscosity gain of DC 1 is higher than the proposed QuoVadis, however, the maximum viscosity of QuoVadis may be up to 100 times greater than that of DC 1. In addition, the maximum viscosity of QuoVadis G3 B occurs with neutralization of only 10% of the acid of the diverter, while for DC 1 it is necessary to neutralize 60% of the acid and, still, after reaching the maximum, QuoVadis G3 C maintains its viscosity practically unchanged from 40 to 60% neutralization, which is not observed for DC 1. Under shear of 10 s$^{-1}$ and 100 s$^{-1}$ the behavior is very similar and QuoVadis stands out in both scenarios. The increase in viscosity of DC 1 is still higher than that of QuoVadis, but in all other respects the characteristics of QuoVadis are much more interesting. Maximum viscosity occurs at neutralization percentages lower than DC 1, the viscosity modulus is at least one order of magnitude higher than DC 1, and for QuoVadis G3 C the maximum viscosity remains practically constant over a neutralization range of 20 to 70%, showing the resistance of the fluid to maintaining its maximum viscosity even under the neutralization process. This characteristic, important to prolong the diverter phenomena, is not observed for DC 1 in both shear rates.

Table 1 summarizes the rheological results shown in FIGS. 2a-2f in terms of the five parameters representing the efficiency of the diverter fluids presented above. Table 1 shows the parameters obtained at standby and under shear of 10 s$^{-1}$ and 100 s$^{-1}$ for three different generations of QuoVadis, one of which contains three modalities (A, B and C), in addition to two diverter commercial (DC), one of them being evaluated in four different batches (A, B, C and D).

TABLE 1

Comparison between commercial diverters (DC) and the different generations of the QuoVadis product, with the third generation being subdivided into three different formulations. The data presented refer to viscosity at standby and under shear of 10 s$^{-1}$ and 100 s$^{-1}$ at 25° C. (I) Percentage of neutralization where the fluid gains viscosity; (II) Comparison of the maximum viscosity, h$_{max}$, in relation to the initial viscosity of the fluid, h$_0$; (III) Nominal value of the maximum viscosity modulus reached; (IV) Neutralization range in which the diverter maintains its maximum viscosity; (V) Neutralization where the fluid loses viscosity.

| Sample | Parameter | Standby | Shear rate 10 s$^{-1}$ | Shear rate 100 s$^{-1}$ |
|---|---|---|---|---|
| DC1 batch A | (I)/% | 50 | 50 | 50 |
| | (II)/adm | 16.4 | 13.7 | 6.2 |
| | (III)/cP | 731 | 600 | 243 |
| | (IV)/% | 50 | 40 and 50 | 40 and 50 |
| | (V)/% | 60 | 60 | 60 |
| DC1 batch B | (I)/% | 60 | 60 | 60 and 70 |
| | (II)/adm | 36.8 | 34.9 | 13.4 |
| | (III)/cP | 616 | 593 | 222 |
| | (IV)/% | 60 and 70 | 60 and 70 | 60 and 70 |
| | (V)/% | 80 | 80 | 80 |
| DC1 batch C | (I)/% | 60 | 60 | 60 |
| | (II)/adm | 17.8 | 17.4 | 9.1 |
| | (III)/cP | 424 | 413 | 211 |
| | (IV)/% | 60 | 60 | 60 and 70 |
| | (V)/% | 70 | 70 | 70 |
| DC1 batch D | (I)/% | 50 | 50 | 60 |
| | (II)/adm | 12.1 | 12.3 | 8.5 |
| | (III)/cP | 430 | 434 | 289 |
| | (IV)/% | 50 and 60 | 50 and 60 | 50 and 60 |
| | (V)/% | 70 | 70 | 70 |
| DC 2 | (I)/% | 0 | 30 | 10 |
| | (II)/adm | 1.0 | 1.2 | 1.5 |
| | (III)/cP | 160858 | 1065 | 218 |
| | (IV)/% | 0 and 10 | 0 to 30 | 10 and 20 |
| | (V)/% | 60 | 60 | 60 |
| QuoVadis G1 | (I)/% | 40 | 40 | 60 |
| | (II)/adm | 5.4 | 4.6 | 2.4 |
| | (III)/cP | 1809 | 1460 | 400 |
| | (IV)/% | 20 to 60 | 20 to 60 | 20 to 60 |
| | (V)/% | 70 | 70 | 70 |
| QuoVadis G2 | (I)/% | 40 | 40 | 80 |
| | (II)/adm | 10.9 | 7.6 | 3.4 |
| | (III)/cP | 3794 | 2590 | 688 |
| | (IV)/% | 30 to 50 | 30 to 60 | 70 and 80 |
| | (V)/% | 90 | 90 | 90 |
| QuoVadis G3 A | (I)/% | 0 | 10 | 30 |
| | (II)/adm | 1.0 | 1.0 | 1.3 |
| | (III)/cP | 26264 | 6722 | 911 |
| | (IV)/% | 0 and 10 | 0 to 30 | 0 to 30 |
| | (V)/% | 60 | 60 | 60 |
| QuoVadis G3 B | (I)/% | 10 | 10 | 60 |
| | (II)/adm | 2.1 | 1.1 | 1.4 |
| | (III)/cP | 66433 | 5934 | 875 |
| | (IV)/% | 10 and 20 | 0 to 50 | 10 and 20; 50 and 60 |
| | (V)/% | 70 | 70 | 70 |
| QuoVadis G3 C | (I)/% | 30 | 40 | 30 |
| | (II)/adm | 10.8 | 4.8 | 1.8 |
| | (III)/cP | 13186 | 5004 | 656 |
| | (IV)/% | 30 and 40 | 20 to 60 | 10 to 70 |
| | (V)/% | 80 | 80 | 80 |

Based on the data presented in FIGS. 2a-2f and Table 1, it is possible to observe several points where at least one generation of the QuoVadis product is superior to commercial fluids. That is for the parameters I to V, described up to now, and a few more characteristics. For example, it is possible to observe that commercial diverter 1, available on the market, presents inconsistent and poorly reproducible results when different batches are submitted to the same analysis procedure. Furthermore, different generations and embodiments of Quo Vadis present different behaviors, causing generations 1, 2 and 3 (embodiment C) to present characteristics more similar to those obtained for commercial diverter 1 and the samples of generation 3, embodiments A and B, have characteristics that approach the commercial diverter 2.

Returning to the parameters of I and V, still based on FIGS. 2a-2f and Table 1, it was possible to point out numerous advantageous characteristics of QuoVadis against the commercial diverters studied. In general, all generations and embodiments of QuoVadis showed an increase in viscosity at lower neutralization percentages than the commercial formulations (parameter I), reaching maximum values of apparent viscosity higher than those found for commercial products (parameter III). This maximum viscosity can extend, up to 70% of the nominal value, over a wide range of neutralization percentages compared to commercial deviants 1 and 2 (parameter IV). Finally, the viscosity of QuoVadis decreases by an invariably higher percentage of neutralization than the commercial products compared (parameter V). Comparing commercial diverter 1 with QuoVadis from generations 1, 2 and 3 (embodiment C), it is noted that better results are obtained, according to the description, for all parameters considered, with the exception of parameter II. It is worth mentioning that, although the ratio $\eta_{max}/\eta_0$ for DC 1 is higher than the values obtained for QuoVadis, its initial viscosity is lower than those obtained in this invention; justifying the observed difference. Furthermore, $\eta_{max}$ for DC 1 is achieved at relatively higher neutralization percentages than those obtained for QuoVadis. The QuoVadis G3, variations A and B, surpassed the DC 2 in all the evaluated items, with the exception of parameter III.

Figure 4:
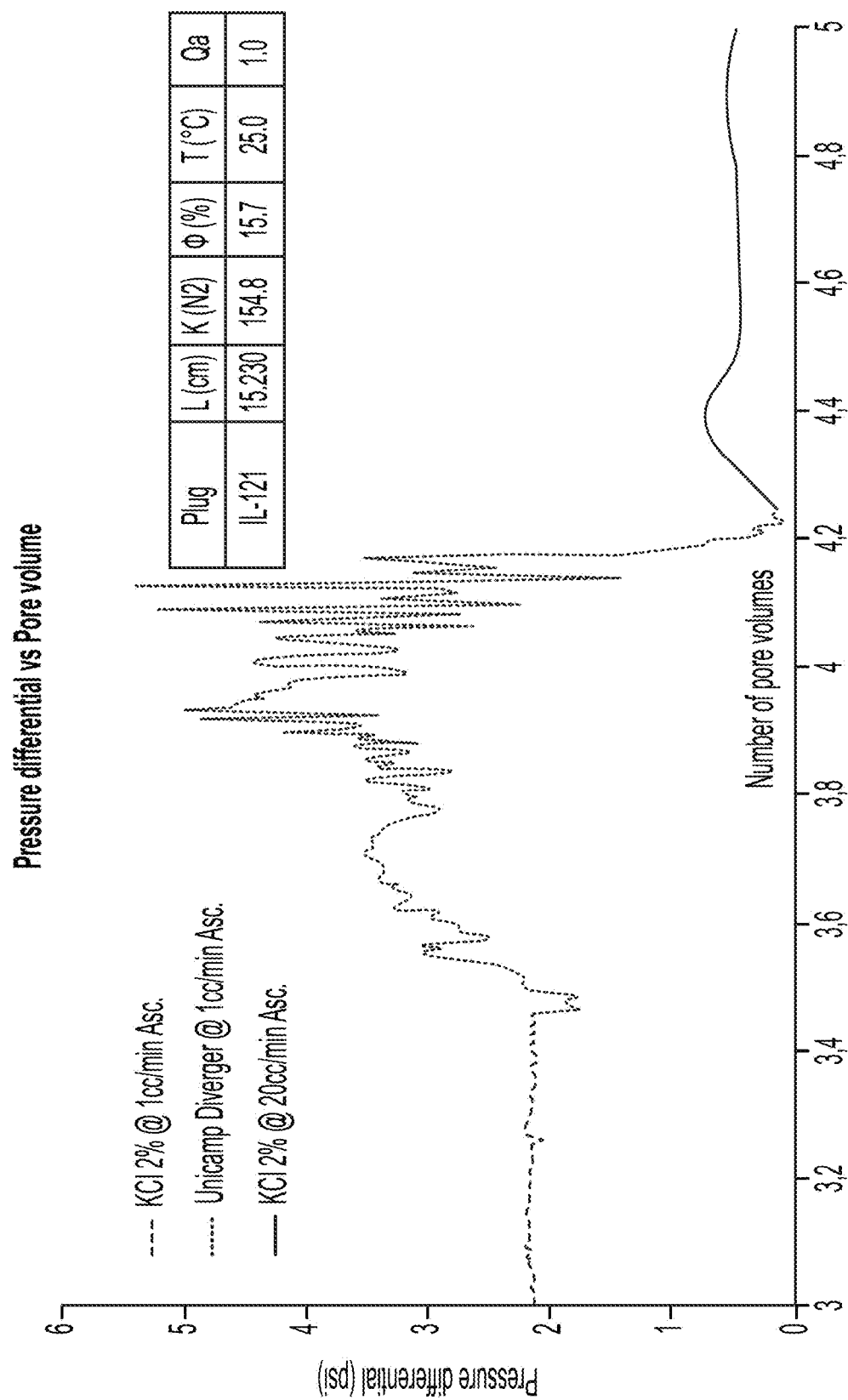
FIG. 4 shows the pressure variation as a function of the pore volume of fluid injected by QuoVadis in the core-flooding simulator. The petrophysical properties of the carbonaceous rock used are shown in the graph, where L is the billet length, K the permeability, F the porosity and Q the flow in mL/min.

Flow simulation tests in carbonaceous rocks using a matrix flow system (core-flooding) were performed for QuoVadis G1. One of the results obtained is shown in FIG. 4, where the pressure differential variation (dP) as a function of the pore volume (VP) of injected fluid is shown.

With the injection of the diverter QuoVadis G1 fluid, the pressure increase is initially observed in an approximately continuous way, until reaching a local maximum where, then, with the continuous injection of fluid, dP becomes noisier and new peaks of maximum of dP are observed. Probably, the first region of the flow, less noisy, is dominated mainly by the injection flow instead of the acid-rock reaction and is associated with the incorporation of the fluid in the rock matrix in order to occupy part of the pore volume and the partial formation of the main trunk of the wormhole. As the fluid-rock reaction progresses, the fluid viscosity increases and the phenomenon of diverter begins to occur, which is probably associated with the noisier region of FIG. 4. In this step, possibly, the trunk propagation delay of the wormhole and the formation of alternative pathways lateral to the main trunk (vascularization). An interesting parameter of the matrix flow tests is the $D_{Pmax}/DP_{initial}$ ratio. Table 2 shows the average of $DP_{max}/DP_{initial}$ of three tests in flow simulators for the commercial fluid DC 1 and QuoVadis.

TABLE 2

Average $DP_{max}/DP_{initial}$ obtained through tests in matrix flow simulator for commercial diverter (DC) 1 and QuoVadis fluid

| Fluid | Rock | $DP_{max}/DP_{initial}$ | Average |
|---|---|---|---|
| DC 1 | CP-174 | 1.18 | 1.3 ± 0.2 |
|  | IL-304 | 1.63 |  |
|  | IL-298 | 1.08 |  |
| QuoVadis | IL-111 | 1.33 | 2.1 ± 0.6 |
|  | IL-122 | 2.01 |  |
|  | IL-121 | 3.05 |  |

Flow tests performed for DC 1 had lower mean $DP_{max}/DP_{initial}$ than that obtained for QuoVadis tests (1.3 and 2.1, respectively). Furthermore, it is interesting to note that the average deviation for the QuoVadis tests is also higher; since one of the tests presented $DP_{max}/DP_{initial}$ almost 2.5 times greater than the average presented for DC 1. Possibly, this parameter is related to the efficiency of the diverter process and formation of alternative paths lateral to the main trunk of the wormhole, which demonstrates the importance of the comparisons made.

Figure 5:
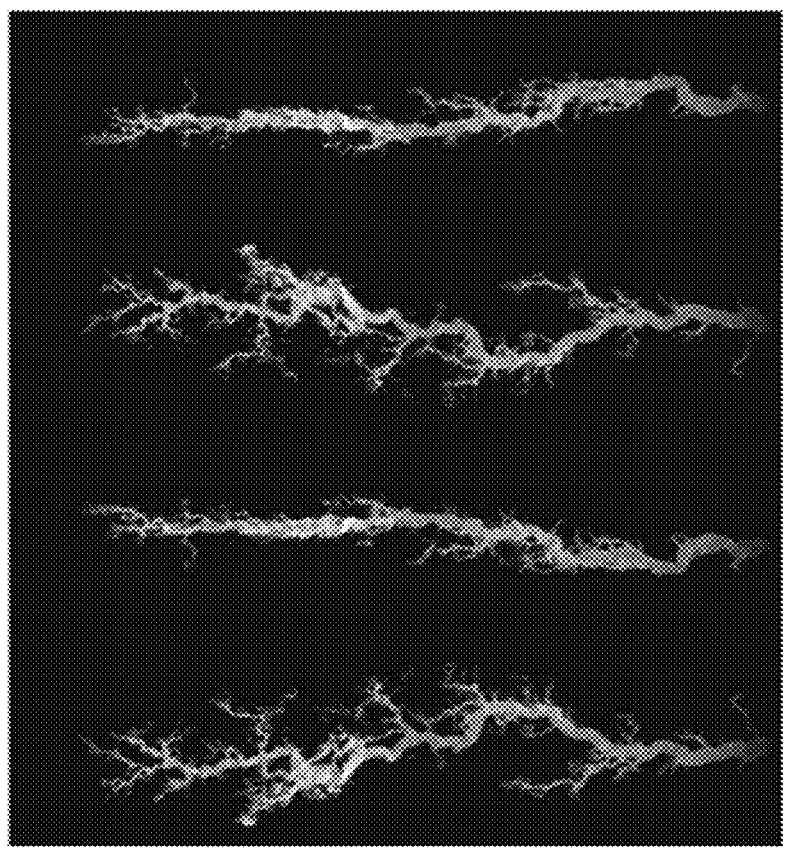
FIG. 5 shows the wormhole formed in Indian carbonaceous rock (IL-122) in a matrix flow test (core-flooding) with the QuoVadis diverter acid fluid. From top to bottom, each figure shows the same 3D image rotated by 90°, longitudinally.

Nuclear magnetic resonance (NMR) experiments were performed with the rocks used in matrix flow tests to obtain 3D images of the resulting specimens, showing the structure of the wormhole formed after the acid treatment. FIG. 5 shows the wormhole formed in Indian rock (IL-122) through matrix flow tests with QuoVadis G1 fluid.

The internal rock dissolution pattern, according to FIG. 5, is the desired one for the acid stimulation process, where a main trunk with limited diameter is formed and several alternative lateral paths are formed due to acid-rock reaction and increase of viscosity. Therefore, the first generation of QuoVadis fluid shows satisfactory results, both rheologically (FIGS. 2a-2f) and through matrix flow testing (FIG. 5).

EXAMPLE OF EMBODIMENT

A QuoVadis solution was prepared of formulation: 0.112 mol $L^{-1}$ cetyl trimethyl ammonium bromide, 0.112 mol $L^{-1}$ phthalic acid, 0.014 mol $L^{-1}$ sodium salicylate, 0.012 mol $L^{-1}$ hexanol, 0.015 mol $L^{-1}$ sodium sulfate, 0.023 mol $L^{-1}$ copper(II) chloride dihydrate, 0.03% (w/w) hydroxypropylmethylcellulose, 0.063% (w/w) poly(vinyl alcohol), 15% (w/w) hydrochloric acid PA and 0.6% (v/v) of corrosion inhibitor CI-34L. The QuoVadis solution was neutralized with calcium hydroxide at concentrations from 0 to 100% and flow curve tests were performed in order to obtain the viscosity of the solutions. The results obtained for the rheological analyzes may be seen in Table 3 and may be interpreted based on the considerations made during the discussion of the document.

TABLE 3

Viscosity results obtained for the rheological tests at different neutralizations and shear rates for QuoVadis and for commercial diverters 1 and 2 (DC1 and DC2, respectively)

| | | Viscosity/cP | | |
|---|---|---|---|---|
| Shear rate | Neutralization | QuoVadis | DC1 | DC2 |
| Standby | 0% | 299.88 | 23.87 | 160857.55 |
|  | 20% | 356.71 | 34.46 | 88827.36 |
| $10\ s^{-1}$ | 0% | 314 | 23.8 | 888 |
|  | 20% | 349.1 | 34.5 | 902 |
| $100\ s^{-1}$ | 0% | 286.9 | 23.87 | 148.23 |
|  | 20% | 305.7 | 34.46 | 179.79 |

An analysis of the data obtained allows observing the gain in viscosity of QuoVadis when neutralized from 0 to 20%. This viscosity gain occurs for the three shear rates evaluated: at standby, the QuoVadis neutralized at 20% showed an increase of 19% in its viscosity; for the shear rates of 10 and 100 $s^{-1}$ the gain was 11 and 6.5%, respectively. The increase in viscosity at low neutralization percentages ensures that the diverter process occurs at the beginning of the well treatment.

When comparing QuoVadis to commercial diverter 1 (DC1), it can be seen that both diverters show a gain in viscosity when neutralized at 20%, but the viscosity of the former is higher at all shear rates for the two percentages of neutralization. When comparing QuoVadis with commercial Diverter 2 (DC2), the differences are more noticeable as the viscosity profile of DC2 is different from QuoVadis. While QuoVadis varies little its viscosity with the shear rate, the viscosity of DC2 drops when it comes out of standby and is subjected to higher shear rates, reaching lower values than QuoVadis for a shear rate of 100 $s^{-1}$ on the two neutralization percentages.

The invention claimed is:

1. A diverter acid fluid composition comprising:
   0.1 to 0.75 mol $L^{-1}$ of cationic surfactants, wherein the cationic surfactant is a quaternary amine, having a general formula I,

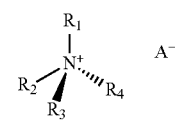

I wherein $A^-$ is a negative group, $R_1$, $R_2$, $R_3$ and $R_4$ in the general formula I are selected from the group consisting of hydrogen and an aliphatic group comprising 1 to 30 carbon atoms, wherein the aliphatic group is straight, branched, saturated, or unsaturated;

0.1 to 0.75 mol $L^{-1}$ of an aromatic molecule that acts as a co-solute, having a general formula II,

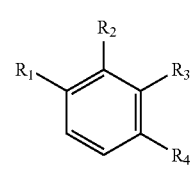

II wherein $R_1$, $R_2$, $R_3$ and $R_4$ in the general formula II are independently selected from the group consisting of hydrogen, an aliphatic chain, and functional groups responsive to changes in acidity of a medium, wherein each functional group is selected from the group consisting of hydroxyl, carboxyl, amine, amide, boranes, borates, phosphates, tosylates, and the respective salts thereof;

a nonionic polymer, wherein the nonionic polymer is selected from the group consisting of poly(acrylamide), poly (methacrylamide), poly(lactic acid), poly(vinylacetate), poly(vinylpyrrolidine), poly(vinyl alcohol), poly (ethylene glycol), poly(methyl methacrylate), poly (propylene glycol), and poly(propylene glycol)-block-poly(ethylene glycol)-block-poly(propylene glycol);

a cellulose-based polymer, wherein the cellulose-based polymer is selected from the group consisting of cellulose, starch, hydroxypropyl methyl cellulose hydroxyethyl cellulose, hydroxymethyl cellulose, and hydrophobically modified hydroxymethyl cellulose;

at least one additive selected from the group consisting of an inorganic salt, an ionic polymer, an alcohol, and any combination thereof;

2 to 30% mass/mass of an inorganic acid;

wherein when the ionic polymer is present, the ionic polymer is selected from the group consisting of poly (acrylamide-co-acrylic acid), polydiallyldimethylammonium chloride, poly(acrylic acid), and the respective salts thereof, and wherein the diverter acid fluid comprises total polymer concentration from 0.01% mass/mass to 5% mass/mass.

2. The diverter acid fluid composition of claim 1, wherein the $R_1$, $R_2$, $R_3$ and $R_4$ in the general formula I are independently selected from the group consisting of straight or branched, saturated or unsaturated, aliphatic groups, wherein each aliphatic group comprises 9 to 30 carbon atoms.

3. The diverter acid fluid composition of claim 2, comprising a mixture of cationic surfactants having the general formula I.

4. The diverter acid fluid composition of claim 1, wherein the aromatic co-solute of general formula II comprises between one and three pH-responsive functional groups selected from the group consisting of hydroxyl, carboxyl, amine, amide, boranes, borates, phosphates, tosylates, and salts thereof.

5. The diverter acid fluid composition of claim 4, comprising a mixture of co-solutes having the general formula II.

6. The diverter acid fluid composition of claim 4, wherein the aromatic co-solute of general formula II comprises two carboxyl groups or the respective salts thereof, in ortho, meta or para positions.

7. The diverter acid fluid composition of claim 1, wherein the additive comprises at least one straight or branched chain alcohol in a concentration between 0.05 to 50 mmol $L^{-1}$, wherein the straight or branched chain alcohol comprises 3 to 15 carbon atoms.

8. The diverter acid fluid composition of claim 1, wherein the additive comprises one or more inorganic salts in a concentration between 0.5 to 50 mmol $L^{-1}$, wherein the inorganic salt is selected from the group consisting of sulfides, chlorides and bromides of: sodium, magnesium, potassium, calcium, iron, copper, barium, and combinations thereof.

9. The diverter acid fluid composition of claim 1, wherein the inorganic acid is selected from the group consisting of hydrochloric acid, sulfuric acid, sulfonic acid, sulfamic acid, hydrofluoric acid, and mixtures thereof.

\* \* \* \* \*